US012015452B2

United States Patent
Marshall et al.

(10) Patent No.: US 12,015,452 B2
(45) Date of Patent: Jun. 18, 2024

(54) ESTIMATING AND USING CHARACTERISTIC DIFFERENCES BETWEEN WIRELESS SIGNALS

(71) Applicant: u-blox AG, Thalwil (CH)

(72) Inventors: Christopher Marshall, Reigate (GB);
Alessandro Biason, Sgonico TS (IT);
Marco Driusso, Cambourne (GB);
Matteo Noschese, Trieste (IT); Fulvio Babich, Trieste (IT); Alessandro Pin, Udine (IT); Roberto Rinaldo, Udine (IT)

(73) Assignee: u-blox AG, Thalwil (CH)

( * ) Notice: Subject to any disclaimer, the term of this patent is extended or adjusted under 35 U.S.C. 154(b) by 275 days.

(21) Appl. No.: 17/310,726

(22) PCT Filed: Feb. 21, 2019

(86) PCT No.: PCT/EP2019/054370
§ 371 (c)(1),
(2) Date: Aug. 19, 2021

(87) PCT Pub. No.: WO2020/169201
PCT Pub. Date: Aug. 27, 2020

(65) Prior Publication Data
US 2022/0109516 A1    Apr. 7, 2022

(51) Int. Cl.
*H04B 17/309*    (2015.01)

(52) U.S. Cl.
CPC .................. *H04B 17/309* (2015.01)

(58) Field of Classification Search
CPC . H04B 17/309; G01S 5/0218; G01S 5/02523; G01S 11/02; G01S 5/021; G01S 5/0236
See application file for complete search history.

(56) References Cited

U.S. PATENT DOCUMENTS

| | | | |
|---|---|---|---|
| 7,593,736 B1 * | 9/2009 | Duffett-Smith | G01S 5/14 455/457 |
| 2015/0094065 A1 * | 4/2015 | Su | H04W 36/30 455/436 |

(Continued)

FOREIGN PATENT DOCUMENTS

| | | | | |
|---|---|---|---|---|
| EP | 1235076 A1 * | 8/2002 | | G01S 5/0036 |
| WO | WO-2011130997 A1 * | 10/2011 | | H04W 64/006 |
| WO | WO 2014/121845 A1 | 8/2014 | | |

OTHER PUBLICATIONS

3GPP TS 36.211 LTE E-UTRA Physical channels and modulation v15.3 (Oct. 2018) (Year: 2018).*

(Continued)

*Primary Examiner* — Ayaz R Sheikh
*Assistant Examiner* — David Zhijun Sun
(74) *Attorney, Agent, or Firm* — Finnegan, Henderson, Farabow, Garrett & Dunner, LLP

(57) ABSTRACT

A method and apparatus are provided for estimating characteristic differences between wireless signals transmitted from the same location in spaced apart frequency ranges. Also provided are a method and apparatus for estimating a combined time of arrival of the wireless signals, using the characteristic differences. A further method is provided, for identifying that two signals have been transmitted from the same location. Also disclosed is a method of maintaining a database of characteristic difference information.

18 Claims, 13 Drawing Sheets

(56) References Cited

U.S. PATENT DOCUMENTS

| | | |
|---|---|---|
| 2016/0088429 A1 | 3/2016 | Gao et al. |
| 2017/0150383 A1* | 5/2017 | Driusso .................. G01S 11/08 |
| 2019/0094377 A1* | 3/2019 | Pon ........................ G01S 19/30 |
| 2021/0373116 A1* | 12/2021 | Stare ........................ G01S 1/06 |

OTHER PUBLICATIONS

3GPP TS 36.413 LTE E-UTRAN S1 Application Protocol v15.3 (Sep. 2018) (Year: 2018).*

International Search Report and Written Opinion for corresponding application No. PCT/EP2019/054370, dated Nov. 15, 2019.

B. H. Fleury et al., "Channel parameter estimation in mobile radio environments using the SAGE algorithm", IEEE Journal on Selected Areas in Communications, vol. 17, No. 3, Mar. 1999.

* cited by examiner

ESTIMATING AND USING CHARACTERISTIC DIFFERENCES BETWEEN WIRELESS SIGNALS

RELATED APPLICATIONS

This application is a U.S. national stage entry under 35 U.S.C. § 371 from PCT International Application No. PCT/EP2019/054370, filed Feb. 21, 2019, which is incorporated herein by reference.

FIELD OF THE INVENTION

This invention relates to timing and positioning calculations, based on observations of wireless signals. More particularly, it relates to methods and apparatus for estimating one or more characteristic differences between wireless signals transmitted from the same location. It further relates to the use of those characteristics for positioning and/or timing determinations.

BACKGROUND OF THE INVENTION

Positioning using Global Navigation Satellite Systems (GNSS), such as the Global Positioning System (GPS) is known. Traditionally, the calculation of position relies on trilateration, based on the time of arrival of signals from multiple different satellites. In the case of GPS, for example, satellite signals in the L1 band are conventionally used for the trilateration. The GPS satellites also transmit a signal on further frequencies including the L2 band, which in combination together with the L1 band signal are traditionally used for taking into account ionospheric error.

With all positioning systems, it would be desirable to increase the positioning accuracy. GNSS systems in particular also suffer from the problem of availability: there are many environments in which it is difficult or impossible to receive satellite signals reliably—especially in dense urban environments or indoors. It would therefore be desirable to develop a positioning system that offers greater coverage and can calculate position in circumstances when traditional GNSS positioning would fail or become unreliable.

In many environments—including environments where GNSS availability may be limited—a variety of other signals is available, which may be used to infer information about position. These include so-called "signals of opportunity"—signals whose primary purpose is not to support positioning systems, but which contain useful implicit information about position. These signals of opportunity can include (but are not limited to): terrestrial communications signals; and terrestrial broadcast signals. It would be desirable to exploit these signals to extract as much positioning information as possible from them, as accurately as possible.

It will be understood that any signal that is capable of providing positioning information is also capable of providing timing information, since position and time are related by the speed of the wireless signal (the speed of light, c). Therefore, discussions in this document about the determination of position apply similarly to the determination of time.

SUMMARY OF THE INVENTION

The invention is defined by the claims. According to a first aspect of the present invention, there is provided a method of estimating one or more characteristic differences between two wireless signals, the method comprising:

receiving a first wireless signal transmitted in a first frequency range;

receiving a second wireless signal transmitted in a second frequency range, wherein the second frequency range is spaced from the first frequency range, and wherein the second wireless signal is transmitted from the same location as the first wireless signal; and processing the first wireless signal and the second wireless signal to estimate the one or more characteristic differences between them, the one or more characteristic differences comprising at least one or any combination of two or more of:

a relative offset in their time of transmission;
a relative carrier phase relationship between them; and
a relative amplitude relationship between them.

The set of one or more characteristic differences is preferably suitable for supporting a timing measurement.

In practice, transmitting the signals from the "same location" means that a distance between an antenna that transmits the first wireless signal and an antenna that transmits the second wireless signal is much smaller than a distance from either antenna to a receiver of the signals. For example, the distance between the antennas may be at most 10%, 5%, 2%, 1%, or 0.1% of the distance from either antenna to a receiver. The antennas may be less than 10 m, 5 m, 2 m, or 1 m apart. The antennas are preferably mounted on the same structure, for example, the same tower (such as a cellular communications tower). In some embodiments, both signals may be transmitted from a common antenna.

Generally, the closer together the antennas, the more effective the method will be. For some purposes, two antennas (or sets of antennas) near to one another on the same tower would be sufficiently close, at least for the time of arrival and amplitude differences to be useful, even if possibly not for the phase difference. The appropriate limits will depend on the implementation—in particular, on the size of the region in which the signals are to be used and the desired accuracy of the measurement results.

In some embodiments, the first wireless signal is transmitted from at least one first antenna and the second wireless signal is transmitted from at least one second antenna, different from the first antenna. The first and second antennas are mounted on the same mast or tower. The first antenna is part of a first wireless infrastructure network and the second antenna is part of a second, different wireless infrastructure network. In this way, a method according to an embodiment of the invention can be used to support combining signals from different wireless infrastructure networks (in particular, for combined time of arrival estimation).

The statement that the frequency ranges are "spaced from" one another means that there is no common, overlapping frequency at which both of the signals exist. On the contrary, there are one or more frequencies between the first frequency range and the second frequency range at which neither the first signal nor the second signal exists or is detectable.

In many cases, the signals are not transmitted coherently (that is, there is no predetermined relationship between their carrier phases). However, this is not essential.

Note that, in some embodiments, the amplitude and carrier phase of each wireless signal may be represented as a complex amplitude value for each signal. In this case, the reference above to the "amplitude" relationship means the relationship between the magnitudes of the respective complex numbers. The reference to the carrier phase relationship means the relationship between the phase angles of the complex numbers.

The characteristic differences observed between the two signals are substantially independent of the position of the receiver (at large distances from the transmitting antenna or antennas), because the signals are being transmitted from the same location, as defined above. Therefore, to the extent that the channel (that is, the channel transfer function or channel impulse response) is similar at the two different frequencies of the signals, the characteristic differences present upon transmission will be preserved at all reception locations. If the timing, frequency, and phase of each signal are relatively stable (as is true for many modern communications signals), the characteristic differences will also be relatively stable over a given time-period of interest. In particular, the characteristic differences may change more slowly than the channel conditions.

The first wireless signal may be received by a first electronic communications device and the second wireless signal may be received by a second electronic communications device. The first and second devices may be the same device or different devices. Each of the first device and the second device may be moving or stationary. The first and second devices are preferably (but not necessarily) at the same location. When the first and second devices are at different locations, the propagation path (and potentially the distance from the base station) to the devices will be different. The propagation time will differ as a result of the different path length; the amplitude loss due to propagation will differ as a result of the different distance and propagation; and the phase difference will be largely random, as a result of the different propagation to the different locations. This should preferably be taken into account; otherwise, the uncontrolled differences may degrade the accuracy that is achievable. Nevertheless, despite these limitations, the use of different devices may still be helpful for estimating characteristic difference information—for example, obtaining a rough estimate of one or more characteristic differences, or their rate of change over time. This may be true, in particular, of the time difference (and rate of change of time difference)—for example the current frame timing difference. It may also be useful for the characteristic amplitude difference—for example, the current power level difference.

The wireless signals may be processed by a third device to estimate the one or more characteristic differences. The third device may be the same device as one of the first or second devices, or may be a different device.

In some embodiments, the method may comprise: receiving the first and second wireless signals at a first electronic communications device, to produce a first received version of the first wireless signal and a first received version of the second wireless signal; receiving the first and second wireless signals at a second electronic communications device, to produce a second received version of the first wireless signal and a second received version of the second wireless signal; and processing the first received versions of the signals and the second received versions of the signals to estimate the one or more characteristic differences. In other words, the estimation of the one or more characteristic differences may integrate observations by a plurality of different devices. These different devices may be at different locations, and may be stationary or moving. The location of at least one of the devices may be known. Once again, the processing may be done by a third device, which may be the same device as one of the first or second devices, or may be a different device.

Alternatively or in addition, the method may comprise: receiving a first instance of the first wireless signal at a first electronic communications device; receiving a first instance of the second wireless signal at the first electronic communications device; receiving a second instance of the first wireless signal at a second electronic communications device; receiving a second instance of the second wireless signal at the second electronic communications device; and processing the received first and second instances of each of the wireless signals to estimate the one or more characteristic differences. The first and second devices may be the same or different devices. Thus, the same device may receive different instances of the first and second wireless signals at different times (and optionally in different locations), or different devices may receive different instances of the first and second wireless signals. These different instances may be used to estimate the one or more characteristic differences.

Combining multiple observations in ways like those described above may help to increase the accuracy of the estimation. It can also allow a rate of change of at least one of the characteristic differences to be estimated, as discussed in greater detail below.

The first and second wireless signals may be synchronisation signals (typically signals whose format, characteristics, and/or content is known in advance at the receiver). Several instances of the first and second wireless signals may be transmitted. In particular, these signals may be periodically transmitted. In one example, one or both of the first wireless signal and the second wireless signal may be a Long-Term Evolution (LTE) signal. In this case, each of the first wireless signal and the second wireless signal may comprise or consist of a Common Reference Signal (CRS) when receiving the downlink signals from the transmitter of a base station, or of a Demodulation Reference Signal (DMRS) when receiving the uplink signals from the transmitter of a nearby User Equipment.

Processing the first wireless signal and the second wireless signal to estimate the one or more characteristic differences may comprise: processing the first wireless signal to estimate a first channel impulse response; processing the second wireless signal to estimate a second channel impulse response; and comparing the first channel impulse response with the second channel impulse response to estimate the one or more characteristic differences.

Comparing the first channel impulse response with the second channel impulse response may comprise calculating a cross-correlation function between the first channel impulse response and the second channel impulse response.

In particular, the relative offset in the time of transmission can be obtained by cross-correlating the first channel impulse response with the second channel impulse response, and estimating the relative offset based on the location of a peak in the cross-correlation function.

The method may further comprise identifying one or more first multipath components in the first channel impulse response and identifying one or more second multipath components in the second channel impulse response, wherein the one or more characteristic differences are estimated based on the identified multipath components, or the one or more characteristic differences are estimated jointly with the identifying of the multipath components.

In some cases, comparing the channel impulse responses to estimate the one or more characteristic differences may comprise comparing the one or more first multipath components with the one or more second multipath components.

Each multipath component may be characterised by a respective time delay. The method may further comprise estimating these time delays.

Note that, in general, it may not be necessary to identify all of the multipath components in a signal. For example, the multipath components may include one line-of-sight (direct path) component and one non-line-of-sight component, even if there is actually more than one non-line-of-sight component.

A transmitter of at least one of the wireless signals may have a plurality of different transmission modes, wherein the method optionally further comprises estimating one or more characteristic differences between the wireless signals for each respective transmission mode.

The different transmission modes may be associated with different transmission power levels and/or different antenna configurations, for example.

In some embodiments, the method may further comprise estimating a combined time of arrival for the first wireless signal and the second wireless signal, wherein said estimating is done jointly with processing the first wireless signal and the second wireless signal to estimate the one or more characteristic differences.

Here, the word "jointly" means that the one or more characteristic differences and the combined time of arrival are estimated in a joint multi-dimensional optimization calculation. Preferably, the first wireless signal and the second wireless signal are combined together in a single function (while taking into account their respective different frequency ranges). The single function is then input into the optimization calculation.

The optimization calculation may be iterative—for example, involving estimating the one or more characteristic differences, based on a current estimate of the combined time of arrival, and estimating the combined time of arrival based on a current estimate of the one or more characteristic differences.

In some embodiments, the Maximum Likelihood (ML) criterion is used for the optimization calculation. The optimisation calculation may comprise solving a Nonlinear Least-Squares optimisation problem.

In some embodiments, the optimisation calculation may use the Space-Alternating Generalized Expectation-Maximization (SAGE) algorithm.

Alternatively or in addition, the SAGE algorithm may be used to identify the multipath components.

In some embodiments, the optimization may be iterative—for example, iterating between estimating the combined time of arrival and estimating the one or more characteristic differences, until each variable converges to a stable value.

The inventors have recognised that because the two signals are in different frequency bands, combining information about the two signals can allow a more accurate estimation of the combined time of arrival than can be achieved by estimating their individual times of arrival separately. Combining information about the two signals leads to a wider effective bandwidth, and the bandwidth is inversely related to error in the time of arrival estimate.

The combined time of arrival is preferably estimated based on a coherent combination of the first wireless signal and the second wireless signal.

In some embodiments, estimating the combined time of arrival may be done jointly with comparing the first channel impulse response with the second channel impulse response to estimate the one or more characteristic differences.

In some embodiments, the method may further comprise estimating a combined time of arrival for the first wireless signal and the second wireless signal, based on: the first wireless signal; the second wireless signal; and the one or more characteristic differences.

Again, the combined time of arrival is preferably estimated based on a coherent combination of the first wireless signal and the second wireless signal.

The combined time of arrival may be estimated based on the first wireless signal and the second wireless signal either directly or indirectly. In one example of estimating indirectly, the method comprises estimating the combined time of arrival based on the first channel impulse response, the second channel impulse response, and the one or more characteristic differences.

A first device may estimate the one or more characteristic differences and a second device may estimate the combined time of arrival based on those characteristic differences. The first and second devices may be the same device or different devices.

Estimating the combined time of arrival optionally comprises: aligning the first channel impulse response and the second channel impulse response, based on the one or more characteristic differences, to generate aligned channel impulse responses; combining the aligned impulse responses, to generate a combined channel impulse response; and estimating the combined time of arrival from the combined impulse response.

Combining the aligned impulse responses may comprise summing them.

In some embodiments, the method may further comprise estimating a combined time of arrival for the first wireless signal and the second wireless signal, based on: the first multipath components; the second multipath components; and the one or more characteristic differences.

In some embodiments, the method may further comprising estimating a combined time of arrival for the first wireless signal and the second wireless signal, wherein said estimating is done jointly with: (i) processing the first wireless signal and the second wireless signal to estimate the one or more characteristic differences and/or (ii) identifying the first multipath components and the second multipath components.

The method may further comprise: identifying a first line-of-sight component from among the first multipath components; and identifying a second line-of-sight component from among the second multipath components, wherein the combined time of arrival is estimated based on the first and second line of sight components.

As mentioned previously, each multipath component may be characterised by a respective time delay. A line-of-sight component may be identified by selecting the multipath component having the minimum time delay.

The inventors have recognised that coherent processing of the first and second wireless signals can be beneficial even if there is some difference in the multipath conditions in the different frequency ranges. In particular, even though the non-line-of-sight multipath components may be somewhat different in the different frequency ranges, the line-of-sight component (that is, the direct path) is likely to be substantially the same for both ranges. This can be exploited by focusing on the line-of-sight components when estimating the combined time of arrival.

Optionally, when estimating the combined time of arrival, multipath components other than the identified first and second line-of-sight components are ignored.

Estimating the combined time of arrival optionally comprises: aligning the first multipath components and the second multipath components, based on the one or more characteristic differences, to generate an aligned set of multipath components; and estimating the combined time of arrival from the aligned set of multipath components.

In some embodiments, the method may comprise transmitting the estimated one or more characteristic differences to another device, for use in estimating the combined time of arrival.

In some embodiments, the method may comprise using the estimated combined time of arrival in the calculation of a position or time.

The method may further comprise estimating a rate of change of at least one of the characteristic differences.

The may further comprise generating a model for predicting a value of the at least one characteristic difference at other times.

For example, the model may be a linear, quadratic, periodic, or other model, describing the evolution of the at least one characteristic difference over time.

According to a further aspect of the invention, there is provided a method of identifying that a first wireless signal and a second wireless signal were transmitted from the same location, the method comprising:

receiving, at a first location, a first wireless signal and a second wireless signal, thereby producing first received signals;

receiving, at a second location, the first wireless signal and the second wireless signal, thereby producing second received signals;

processing the first received signals to estimate one or more first characteristic differences between them;

processing the second received signals to estimate one or more second characteristic differences between them;

comparing the one or more first characteristic differences with the one or more second characteristic differences to determine whether they match; and if they match, determining that the first and second wireless signals were transmitted from the same location, wherein the first wireless signal is transmitted in a first frequency range and the second wireless signal is transmitted in a second frequency range, spaced from the first frequency range, and wherein the one or more characteristic differences comprise at least one or any combination of two or more of:
a time offset;
a carrier phase relationship; and
an amplitude relationship.

The characteristic differences may be determined to match if a difference between them is less than a predetermined threshold.

According to another aspect of the invention, there is provided a method of maintaining a database of characteristic difference information associated with groups of signals, each group of signals being transmitted from a respective location, the method comprising:

obtaining one or more characteristic differences between signals in each group, wherein the one or more characteristic differences comprise at least one or any combination of two or more of:
a time offset,
a carrier phase relationship, and
an amplitude relationship,
obtaining identity information identifying each group of signals; and
storing the one or more characteristic differences in the database, associated with the identity information, the method further comprising:
receiving a request for characteristic difference information associated with a target group of signals, the request including target identity information identifying the target group of signals;
searching the database using the target identity information; and
retrieving from the database the one or more characteristic differences for the target group of signals.

In some embodiments, the method may further comprise estimating a combined time of arrival for signals in the target group, using the retrieved one or more characteristic differences.

In some embodiments, the method may further comprise sending the retrieved one or more characteristic differences to another device, for example for use in estimating a combined time of arrival.

The identity information identifying each group of signals preferably identifies the individual signals within the group. In this way, the identity information can provide an indication that the individual signals were transmitted from the same location.

The database optionally further stores, for each group of signals, one or both of: a rate of change of at least one of the one or more characteristic differences associated with the group; and a model for predicting a value of at least one of the one or more characteristic difference at different times.

Also provided is a computer program comprising computer program code configured to cause at least one physical computing device to carry out all the steps of a method as summarised above if said computer program is executed by said at least one physical computing device.

The computer program is preferably embodied on a non-transitory computer readable medium. The at least one physical computing device may be a processor of a wireless communication device, or a processor of a server computer.

According to still another aspect of the invention, there is provided an electronic communications device for estimating one or more characteristic differences between two wireless signals, comprising:

a first receiver, configured to receive a first wireless signal transmitted in a first frequency range;

a second receiver, configured to receive a second wireless signal transmitted in a second frequency range, wherein the second frequency range is spaced from the first frequency range, and wherein the second wireless signal is transmitted from the same location as the first wireless signal; and a processor, configured to process the first wireless signal and the second wireless signal to estimate the one or more characteristic differences between them, the one or more characteristic differences comprising at least one or any combination of two or more of:
a relative offset in their time of transmission;
a relative carrier phase relationship between them; and
a relative amplitude relationship between them.

The processor is optionally further configured to send the one or more characteristic differences to another device, for use in estimating a combined time of arrival.

According to another aspect of the invention, there is provided an electronic communications device comprising:

a first receiver, configured to receive a first wireless signal transmitted in a first frequency range;

a second receiver, configured to receive a second wireless signal transmitted in a second frequency range, wherein the second frequency range is spaced from the first frequency range, and wherein the second wireless signal is transmitted from the same location as the first wireless signal; and
a processor, configured to:
obtain one or more characteristic differences between the first wireless signal and the second wireless signal, and
estimate a combined time of arrival for the first wireless signal and the second wireless signal, based on: the first wireless signal, the second wireless signal; and the one or more characteristic differences.

The processor may obtain the one or more characteristic differences by (i) calculating them; (ii) receiving them from another device that calculated them; (iii) obtaining them from a database, which may be stored on board the electronic communications device or remotely; or (iv) some other means.

Along with the one or more characteristic differences, the processor may also obtain an indication that the first wireless signal is transmitted from the same location as the second wireless signal.

In any apparatus or method as summarised above, the wireless signals may include (but are not limited to) downlink signals or uplink signals in a wireless infrastructure network.

BRIEF DESCRIPTION OF THE DRAWINGS

The invention will now be described by way of example with reference to the accompanying drawings, in which.

DETAILED DESCRIPTION

Figure 1:
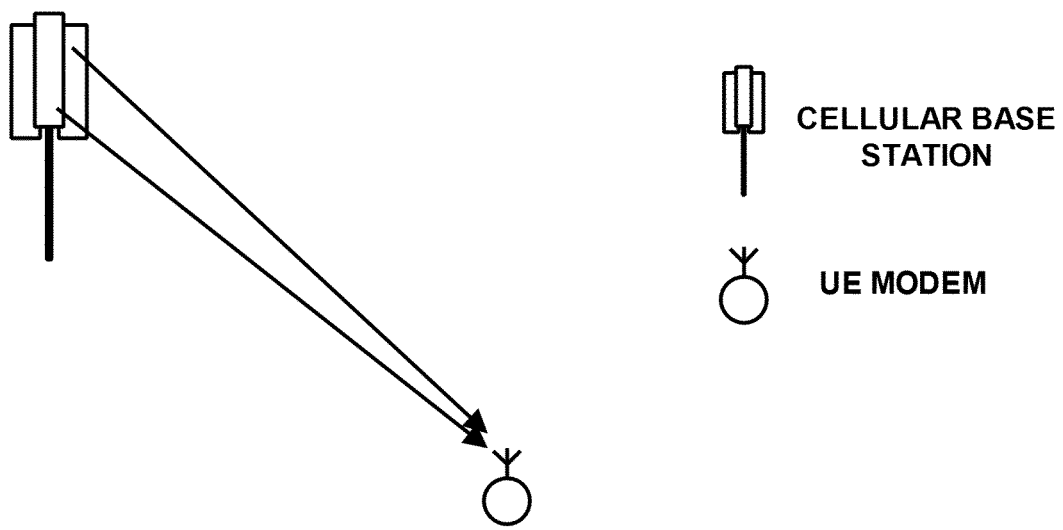
FIG. 1 shows multiple signals receivable by an electronic communications device from a single base station.

Particularly useful embodiments of the present invention relate to wireless infrastructure networks. As used herein, a "wireless infrastructure network" is defined as a wireless network that is organised in a hierarchical manner, comprising one or more instances of User Equipment (UE), wherein each UE communicates with and is served by a Base Station (BS). The communications between each UE and its serving BS are controlled by the BS. Typically, access to the wireless medium is strictly controlled by the BS, which is responsible for coordinating and orchestrating the PHY and MAC layers. Direct, spontaneous, radio communication between UEs is typically not allowed. Types of wireless infrastructure networks include but are not limited to: cellular networks; and Wireless LANs.

Although the following description will focus on the example of a wireless infrastructure network (in particular, a cellular network), this is just one exemplary application, which is used for the purposes of explanation and is not to be understood as limiting the scope.

It is advantageous for positioning if multiple signals can be combined and processed together, as then the bandwidth occupied by the signals can be increased, and the precision of the measurement of time of arrival can be improved. However, the multiple signals may have different characteristics, not known by the receiver. According to embodiments of the present invention, one or more of these unknown characteristics are estimated, and the signals are combined and processed jointly, to improve the estimate of the time of arrival.

A cellular receiver may receive many signals, and it is an advantage for positioning if the multiple signal samples can be combined and processed together, as then the bandwidth occupied by the signals is increased. We propose to receive and process the signals received from multiple opportunistic signals transmitted from the same source location. This will give us extra, good, information about the propagation and distance from the transmission from the source to the receiver.

To make most advantage of the combination of these signals to make measurements, the signals should form a constant and coherent set. Unfortunately, this is normally not the case, and the multiple signals' properties may not be known to the measuring receiver, and may change over time. For example, the two signals from two network operators sharing the same base station mast may be totally unrelated to each other. Therefore, we estimate one or more of the following properties, which are referred to herein as "characteristic differences", or "deltas":

The relative time of transmission of the signals
The relative transmitted power level of the signals
The relative transmission phase of the carrier of the signals By using the multiple signals, and by estimating their relative transmission properties, we propose to estimate the time of arrival of the signal. This allows us to exploit the higher bandwidth range occupied by the set of signals as a whole, rather than just the bandwidth of each signal on its own, and gives improved precision and multipath robustness. We can do this even for rather uncontrolled sets of multiple signals, which happen to be transmitted from the same equipment.

It is increasingly common that a number of cellular base stations are provided from a single mast installation. As a result, a UE modem can receive a number of signals from the same source location, over the same propagation path as illustrated in FIG. 1. The multiple signals follow a similar propagation path and distance from the source to the receiver. They have closely the same time of flight from the source to the target User Equipment (UE). They experience similar propagation conditions, as long as the signal frequencies are not too far apart. They are on different frequencies, so that the set of signals as a whole covers a wider bandwidth than any one of the signals on its own. However, the multiple signals are uncontrolled relative to each other (for example, operated by different network operators) —they have unknown timing, amplitude and phase relative to each other. In particular, they are not transmitted coherently.

Despite these challenges, it would be desirable for the receiver to measure the set of signals in order to improve the measurement of the time of arrival, in order to give high precision, and to be able to resolve multipath effects (which may be a particular problem for positioning indoors).

We propose to receive and process the multiple signals from the source to estimate the time of flight, and to do so even though the signals are not coherently transmitted. We do this by estimating the relative differences between the set of signals, to align the corresponding set of channel impulse responses. The estimation can be structured in a variety of ways, as will be discussed in greater detail below.

Because the relative drift between signals is slow (compared with the variation of the channel) the deltas between the signals can be estimated relatively well, and the joint estimation gives better performance than the estimation of the time of arrival of each signal individually. Below, we will give examples for the estimation of the relative transmitter timing, relative transmitted signal amplitude, and relative phase.

Figure 2:
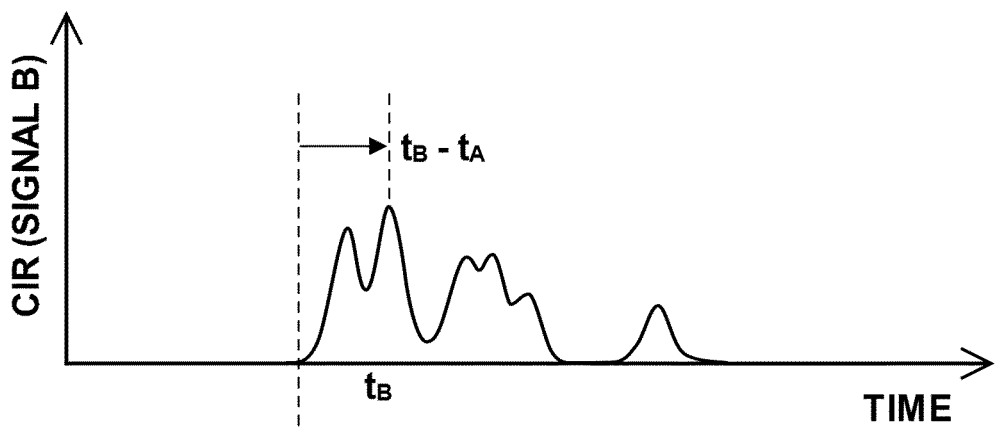
FIG. 2 illustrates Channel Impulse Responses (CIRs) for two signals received from two co-located transmitters, and estimation of the timing offset by cross correlation.
Figure 2:
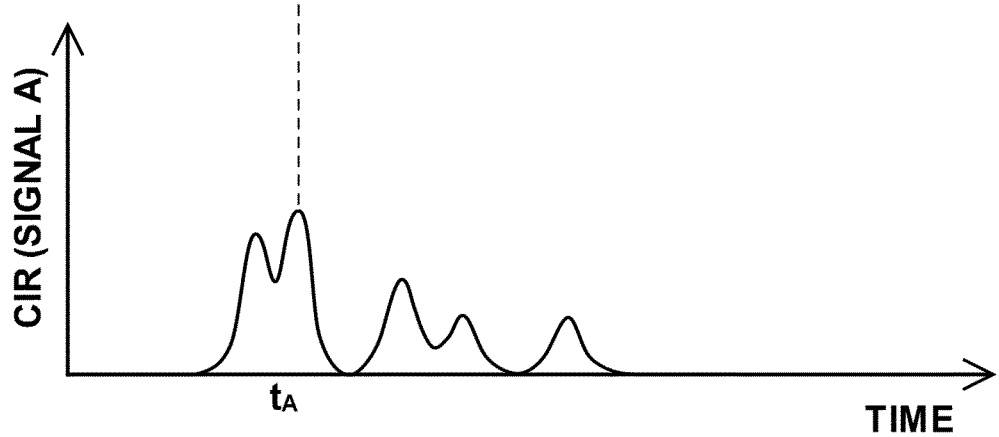

As a first example we will consider the estimation of the relative timing of the multiple signals from the multiple transmitters of two cells from a single base station mast, as illustrated in FIG. 2. If the signals are those of two different network operators, then the relative timing may be completely arbitrary, but even if they are nominally operated by the same network then there might be a timing offset, as a consequence of the system design of the transmitters, and circuit and environmental variations.

Figure 3:
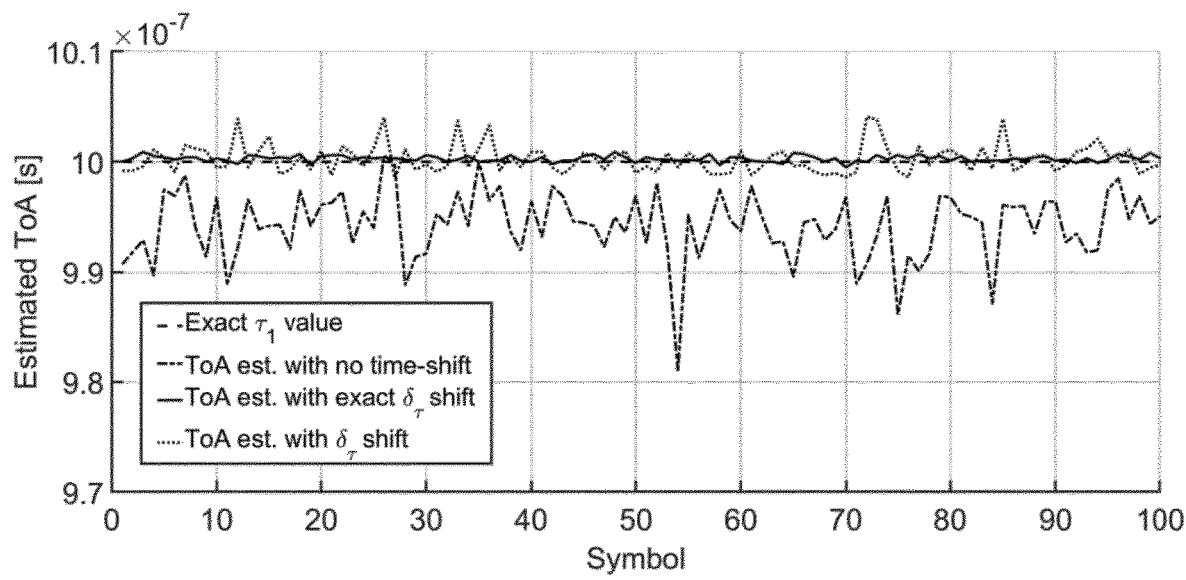
FIG. 3 plots simulation results estimating the time of arrival when also estimating the difference in transmission time.

The impulse response of the two signals, on different frequencies, is similar but not identical, because the propagation conditions will be slightly different for the different antennas, paths and frequencies. However, the main feature is an offset $\delta_\tau$ in the timing of the two signals, which may be substantial, depending on the current relative timing of the two signals. The timing difference may be estimated by performing a cross-correlation of the impulse responses at the two signals, to find the timing delta which gives the best match. Once this is taken into account, an improved estimation of the impulse response can be obtained, using both signals, for example as illustrated in FIG. 3. This is a simulation using the SAGE algorithm to estimate the time of arrival (ToA). Two signals at different frequencies are transmitted concurrently. The receiver receives each signal, estimates the relative time difference between the transmissions by cross correlation between them, and then estimates the time of arrival. In FIG. 3, the solid line represents ToA estimation with an exact knowledge of the difference in transmission time, $\delta_\tau$ (that is, the offset in the timing). The dotted line represents estimation with cross-correlation estimation of $\delta_\tau$. The dash-dot line represents estimation based on both signals without adjustment for the time difference. The horizontal dashed line indicates the true time of arrival. Details of the SAGE algorithm can be found in: B. H. Fleury, M. Tschudin, R. Heddergott, D. Dahlhaus and K. I. Pedersen, "Channel parameter estimation in mobile radio environments using the SAGE algorithm," *IEEE Journal on Selected Areas in Communications*, vol. 17, no. 3, pp. 434-450, 1999.

The propagation path assumed in the simulation is set up to be slightly different for the two frequencies. The result is that the signal time of arrival is generally estimated accurately if the time difference between them is first estimated, and then the combination of the two signals then used together.

Note that for cellular signals such as LTE we may use different parts of the frame and indeed different reference signals for the measurements in the two channels. The frame timing of the signals in the two channels may be completely uncoordinated, so that measurement of a reference signal in channel 1 in sub frame number $SFN_1$ should be combined with the measurement of a reference signal in channel 2 transmitted at a similar time, which is then likely to be with a different sub frame number $SFN_2$. The reference signal may well be coded according to the cell identifier, in order to allow the modem to distinguish between the different local base stations. For each channel, the modem will then recover the channel impulse response from the reference signal in the normal way, extracting the code in the process.

As a second example we will consider the estimation of relative transmit power. The amplitude of the signals being combined may differ, as a result of differences in between the antennas or amplifier chains, and/or differences in the power setting between the signals.

Figure 4:
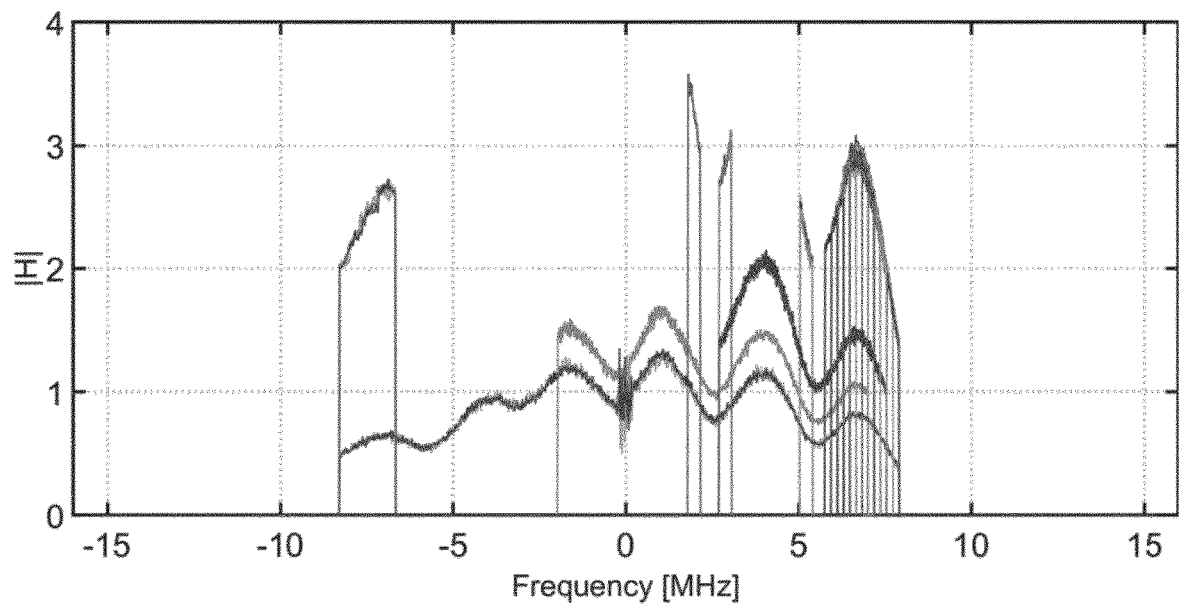
FIG. 4 shows the Channel Frequency Responses (CFR) of a set of signals transmitted over time from a neighbor modem.

In this example, for the sake of variety, we will consider uplink transmissions by a neighbor modem. In this case, the signals to be measured are transmitted sequentially on a set of different frequencies, as determined by commands from the network. The frequency response of a set of received signals is illustrated in FIG. 4. It can be seen that there are some broad-band transmissions, covering a wide frequency range, and that there are some narrower band signals, transmitted at particular frequencies. It is also evident that the power level can vary strongly, due to changes in the transmitter power that the modem is commanded by the base station to use. In this example, the transmitter power level has changed during the course of the measurement. To combine the signals for use in a single measurement, it is therefore necessary to estimate and normalize the power level(s) used for the set of transmissions. When doing this, it is helpful if the receiver is provided with assistance information indicating the power level at which the transmitter is operating, for each time slot. However, this is not essential.

As a third example, we will consider the estimation of phase difference. In order to estimate the time of arrival with the most benefit from the increased bandwidth, we would like to treat the set of signals as coherent—that is, with a known relative phase relationship. The phase difference between the signal channels therefore needs to be estimated. This is non-trivial, since the signals do not overlap in the frequency domain—there is no frequency that is common to both signals, at which their relative phases can be compared directly. However, the phase difference can be estimated in an iterative optimization calculation, such as one of those described in greater detail below.

Embodiments of the present invention can improve the precision and resolution of the estimation of the channel impulse response and the time of arrival of the signal at the receiver. The performance is improved because:
- The multiple measurements improve the signal to noise ratio;
- The multiple signals provide measurement diversity;
- The precision of the measurement is improved (as the precision is related to the total bandwidth occupied, and the so-called "Gabor" bandwidth);
- The measurement is more robust against multipath effects (as the time resolution of the measurement improves, the different paths are able to be distinguished, so that the time of arrival of the direct path can more readily be identified and measured).

Embodiments can therefore improve robustness in indoor environments, which contain significant multipath and make time of arrival measurement difficult. Notably, embodiments need not rely on a fixed or known timing or phase relationship between the multiple signals transmitted on the different frequencies, and so can use sets of multiple signals that are not tightly controlled together, and might not even belong to the same communications network.

Example of Multiple Signals: Multi-Frequency Cellular Base Stations

The multiple signals from the same location may be cellular downlink signals from a base station transmitter, optionally transmitted from the same antenna.

For geographic and economic reasons there are situations when multiple cellular base stations are located in the same place, and transmit signals from the same transmission mast. The signals will then be transmitted on different frequencies. These may be signals from the same network operator, transmitting several channels to provide a high capacity system. This may for example include coordinated "carrier aggregation". Alternatively, they may be signals from different network operators, with different frequency allocations but sharing the use of the physical installation to reduce costs. In this case, separate base stations and systems may be feeding a common antenna assembly.

Figure 5:
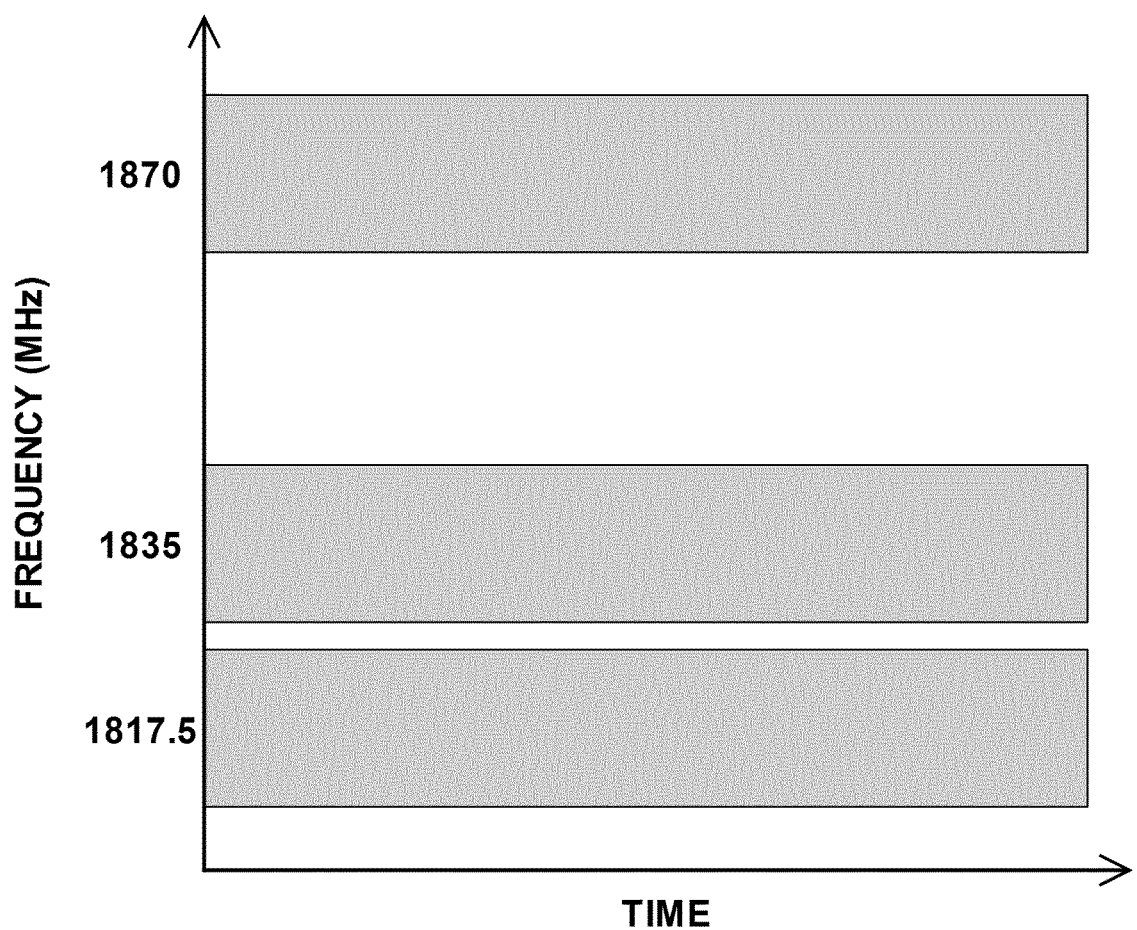
FIG. 5 illustrates transmissions from a cellular mast observed in Monfalcone, Italy.

Note that different synchronization/reference signals may be used for the signals in the two channels. According to a preferred embodiment, this may be handled by using Channel Impulse Responses (CIRs). The CIR can be estimated for each signal separately, and then the CIR can be compared with and used together with the CIR for the other channels. In one real-world example, a cellular mast in Monfalcone, Italy has been observed to be transmitting three signals as illustrated in FIG. 5. Together these span a frequency range of 67.5 MHz, giving a potential ultimate precision that is much improved over the bandwidth of a single channel of 15 MHz.

Example of Multiple Signals: Ranging with Hopping Reference Signals

Hopping reference signals are increasingly proposed for positioning in 3GPP, particularly for narrow band devices. For downlink positioning by the devices—Observed Time Difference of Arrival (OTDoA)—it has been proposed, particularly for NB-IoT, that the base station transmits Narrowband Positioning Reference Signals (NBPRS) on a sequence of frequencies, with the sequence being followed and measured by the UE. In this case, the reference signal components being transmitted and used for measurement are transmitted in a set of different frequency sub-bands (on a set of separate OFDM sub-carriers), which are separated to some extent from each other. In this embodiment, the hopping sequence of reference signal components is measured by the receiver, making corresponding frequency hops, over the course of a number of time slots. Alternatively, the transmitter may be transmitting a set of signal components over a wide bandwidth, containing (in each of several time slots) a spaced set of multiple reference signal components in a set of different frequency sub-bands (for example, separate OFDM sub-carriers). In such an embodiment, a simple frequency-hopping narrow-band receiver may tune to and measure each of these reference signal components in turn, over the course of a number of time slots.

For uplink positioning by the infrastructure—Uplink Time Difference of Arrival (UTDoA)—measurements are made by the infrastructure on a set of signals with the UE transmitter transmitting on a sequence of frequencies. When hopping between frequencies, the transmitter (and, in the case of the downlink, the receiver) may or may not maintain coherence between timeslots. Hence, for best performance and precise measurement of the time of arrival, the delta between the successive slots and reference signals may be estimated and used as part of the measurement process, according to an embodiment of the present invention.

Example of Multiple Signals: Signals from Neighbor Wireless Devices

The multiple signals from the same antenna may also be cellular uplink signals from a nearby modem UE. In this example configuration, the signals are transmitted in different time slots and, for each transmission, they may be allocated resource blocks on different frequencies by the base station. The transmitter modem might not necessarily be operating continuously or coherently between transmissions. This may result in a set of signals transmitted on different frequencies, incoherently.

In some scenarios, it may be possible to specify coherent transmission. However, this is not always possible. According to embodiments of the present invention, the system can be made more flexible and accommodate off-the-shelf incoherent devices, by equipping the receiver to estimate the changes and differences in the signal from the transmitting modem between transmit slots.

Similar situations may arise in short range, ISM band systems, such as ranging using Bluetooth signals hopping over multiple frequencies or a WiFi access point using multiple channels on different frequencies.

In each of the examples above, the receiver UE may be changing frequency ("hopping"), in order to measure the multiple signals. In this case, the estimation of the signal time may also estimate the relative offset in timing for the receiver when operating at the multiple frequencies of the multiple signals. This includes timing or phase offsets as a result of the transition of the synthesizer from one frequency of operation to the next; and/or differences in front end transfer function (group delay) at the different multiple frequencies.

In general, the differences observed between the wireless signals will be affected by differences arising in the receiver, as well as differences arising in the transmitter. Depending upon the application scenario it may be desirable to take into account (and optionally compensate for) the differences created by the receiver.

In some cases, the differences introduced at the receiver may be small and negligible. For example, the time offset arising from the way the two signals are processed at the receiver may be negligible. Therefore, in many cases, it may be unnecessary to compensate for this time offset.

In other cases, the differences introduced at the receiver may be known. This may include, for example, a gain difference or a group delay difference arising from the different operation of the receiver at the two different frequencies concerned. If the receiver is making measurements to estimate characteristic differences for use by itself, or for use by another identical receiver, then it might not be necessary to compensate for these known receiver-generated differences. For example, provided operating conditions such as temperature remain the same, the receiver-generated differences may remain constant and can be neglected in the calculations. In this case, whether the characteristic difference arises in the transmitter or in the receiver, it has the same effect, and its estimation and use is correct.

On the other hand, if the receiver-generated differences are liable to change, or will be used by another receiver with different characteristics, then it may be desirable to compensate for them. If receiver-generated differences for a particular receiver are known, then this can be taken into account to derive a better estimate of the characteristic differences for the transmitted wireless signals—in other words, an estimate of the characteristic differences that is less dependent on the receiver characteristics.

Receiver-generated differences, such as the variation of group delay with frequency and operating conditions, may be known by design, or from calibration measurements made during manufacture of a receiver.

Knowing and compensating for receiver-generated differences may be particularly helpful to reduce the error (improving the estimate of the characteristic differences) when the user of the characteristic differences has a receiver that is substantially different to the receiver that makes the measurements to estimate those characteristic differences. This may be a result of different circuitry, different design, or different operating conditions. Compensating for the receiver-generated differences may also be particularly helpful when combining measurements by multiple different receivers (with potentially different receiver-generated differences).

Estimation Period

The estimation of the delta between the channels may take place over a longer period than the estimation of the channel itself, because in many cases the underlying difference between the signals may change relatively slowly. This is particularly true for the estimation of the signal timing and phase delta between signals. When measurements are made over a substantial period the relative drift rate (the rate of change of timing difference and the rate of change of phase difference) between signals may also be estimated. This may be used to generate a predictive model that can allow the deltas to be predicted at a desired time instant in the future.

Estimation Using the Multipath Components

A more accurate and precise estimation of the delta between two signals may be achieved by using the decomposition of the CIR into its multipath components. An example is illustrated in FIG. 6, for two signals corresponding to FIG. 2.

The decomposition of each channel into its multipath components may be performed for example by the well-known SAGE algorithm. This then allows the deltas in timing, amplitude and phase to be more accurately estimated as part of the processing.

Figure 6:
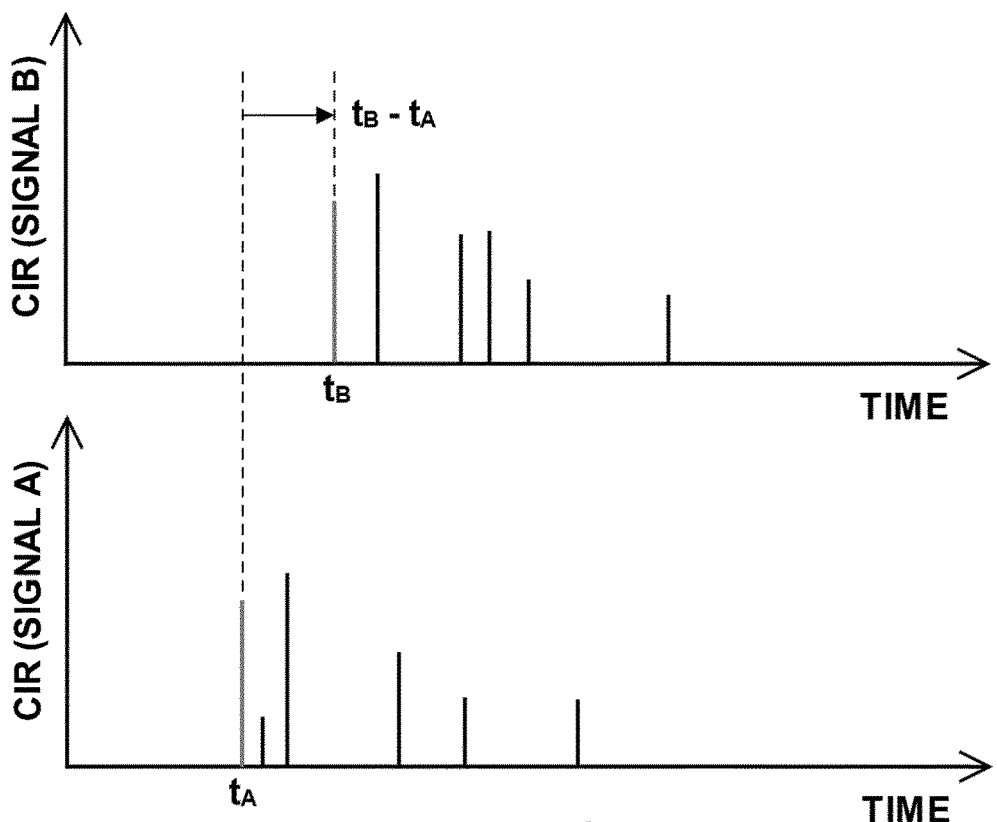
FIG. 6 shows the CIRs for two signals decomposed into multipath components and being aligned based on the multipath component with the shortest time delay.
Figure 7:
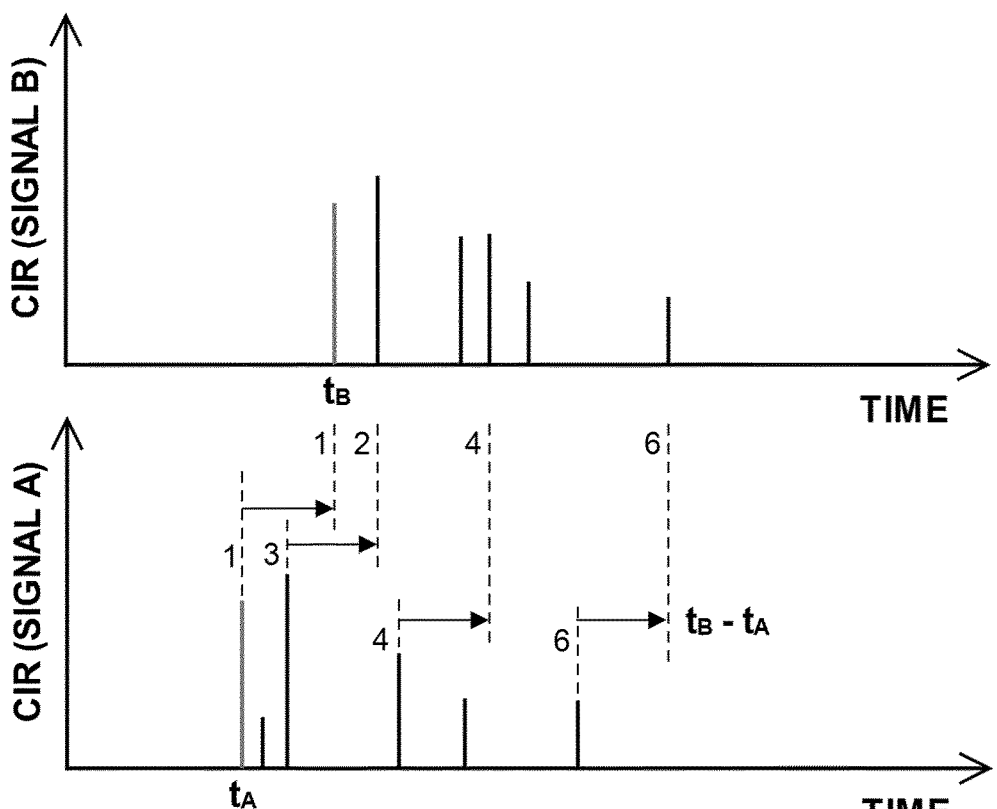
FIG. 7 illustrates the estimation of the delta between the signals in FIG. 6, using the set of multipath components.

The deltas between the channels may be estimated by using the components, singly or jointly, for example using: the strongest signal component in each channel (on the assumption that this will have the smallest error in its measurement); the first path for each channel as illustrated in FIG. 6 (on the assumption that this is likely to be the line-of-sight signal from the transmitter to the receiver); or the deltas between a set of paired components. The estimation of the deltas is illustrated in FIG. 7.

In this example, the two signals happen to have the same number of multipath components, but they are rather different from one another. The set of corresponding multipath signals is identified—four in this case, as shown—and the estimation of the delta in time, amplitude, and phase is then performed by finding the best fit for these corresponding paths.

To identify which multipath components correspond to one another, a list of candidate delta times between the two signals may be created. For example, the list may include all possible time offsets between the time of arrival of pairs of principal multipath components in the first and second signals. For each candidate delta time, the closeness of the match between the set of those multipath components of the first and second signals that are in reasonable alignment is assessed—for example, to estimate the energy that is common to the multipath components for the first and second signals. This is illustrated in FIG. 7. The multipath components in one signal that do not align with components in the other signal (for a given candidate delta time) are not included, as they do not contribute to the match. The delta time offset is then selected which gives the largest value for the common energy.

In some embodiments, the delta offsets between the signals may be estimated jointly together with the estimation of the multipath components, for example iteratively. This is expected to give the best performance. The time of arrival is then produced as the output of this joint estimation, in the form of the timing estimate that is output for the first multipath component from the set of signals. Note that it is not always necessary to find the correspondence between all of the multipath components explicitly, provided the delta offset for the direct path can be found.

System Model

Having described the principles of the system, we now present the calculations that implement these principles in some exemplary embodiments.

Let $H_1(t_n,f_k)$ and $H_2(t_n,f_k)$ be the CFRs corresponding to the two wireless signals in bands $B_1$ and $B_2$, respectively, for the time slot $t_n \in \mathcal{T}$ and sub-carrier $f_k \in B_1 \cup B_2$. The CFRs are observed for a set of uniformly sampled time slots $\mathcal{T}$ and two disjoint sets of uniformly sampled frequency sub-carriers $B_1$ and $B_2$. The CFRs are estimated starting from two distinct signals transmitted from the same antenna mast and received by the same receiver. In this example, $H_1$ and $H_2$ model the same multipath environment.

We consider the following channel model, for every time slot $t_n$ and sub-carrier $f_k$:

$$\mathcal{G}(t_n,f_k) = \sum_{\ell=1}^{L} \alpha_\ell e^{-j2\pi(\mu_\ell t_n - f_k \tau_\ell)}, \tau_1 < \tau_2 < \ldots < \tau_L \quad (1)$$

where L is the number of multipath components and $\alpha_\ell \in \mathbb{C}$, $\mu_\ell \in \mathbb{R}$, $\tau_\ell \in \mathbb{R}$ are the amplitude, Doppler frequency and time of arrival of the $\ell$-th multipath component, respectively. Note that the "amplitude" $\alpha_\ell \in \mathbb{C}$ in this formulation is a complex number; therefore, this parameter expresses both the magnitude and carrier phase of the respective multipath component. Parameters $\alpha_\ell$, $\mu_\ell$ and $\tau_\ell$ are unknown and have to be estimated. In particular, the component with $\ell=1$ is the Line-of-Sight (LoS) component. We assume that the CFRs $H_1$ and $H_2$ describe the same multipath environment, but there may be a misalignment in terms of transmission times, powers and phases between the two CFRs. Therefore, the model of Eq. (1) should be specified for both bands:

$$\mathcal{G}_i(t_n, f_k) = \sum_{\ell=1}^{L} \alpha_{B_i,\ell} e^{-j2\pi(\mu_\ell t_n - f_k \tau_{B_i,\ell})}, i \in \{1, 2\}, \quad (2)$$

where, however, the following relations hold:

$$\alpha_{B_2,\ell} = 1/\delta_\alpha \cdot \alpha_{B_1,\ell}, \quad (3)$$

$$\tau_{B_2,\ell} = \tau_{B_1,\ell} - \delta_\tau, \quad (4)$$

$$\mu_{B_2,\ell} = \mu_{B_1,\ell}, \quad (5)$$

In particular, $\delta_\tau \in \mathbb{R}$ and $\delta_\alpha \in \mathbb{C}$ represent the time of arrival shift and an amplitude ratio difference between the two CFRs, respectively. Note that we assume that the Doppler frequency of the multipath components is the same in the two frequency bands, although a more general model might also involve a Doppler frequency offset $\delta_\mu$.

The model $\mathcal{G}_2$ can be rewritten as a function of $\mathcal{G}_1$:

$$\mathcal{G}_2(t_n, f_k) = 1/\delta_\alpha e^{-j2\pi f_k \delta_\tau} \mathcal{G}_1(t_n, f_k). \quad (6)$$

Intuitively, the CFR $H_i(\bullet)$ represents the observed data corresponding to the model $\mathcal{G}_i(\bullet)$. However, thanks to Eq. (6), we can say that $H_2(t_n, f_k)$ represents the observed data corresponding to the model $1/\delta_\alpha e^{-j2\pi f_k \delta_\tau} \mathcal{G}_1(t_n, f_k)$. Since $H_1(t_n, f_k)$ corresponds to $\mathcal{G}_1(t_n, f_k)$ and $H_2(t_n, f_k)$ corresponds to $1/\delta_\alpha e^{-j2\pi f_k \delta_\tau} \mathcal{G}_1(t_n, f_k)$, it follows that $H_1(\bullet)$ and $H_2(\bullet)$ are intrinsically related. Therefore, $H_1(\bullet)$ and $H_2(\bullet)$ can be used together to extract the parameters of $\mathcal{G}_1(\bullet)$ and the vector of differences $\delta = \langle \delta_\tau, \delta_\alpha \rangle$. In the remainder of the document, we will deal with $\mathcal{G}_1(\bullet)$ and drop the subscript "1" for ease of notation, when appropriate.

Note that using vector $\delta$, instead of dealing with the parameters of the two bands independently, simplifies the process of characterizing the parameters of the channel. In particular, without $\delta$, there would be a total of 8L real variables to be found ($|\alpha_{B_i,}\mathcal{I}_i|$, $\angle\alpha_{B_i,}\mathcal{I}_i$, $\tau_{B_i,}\mathcal{I}_i$, $\mu_{B_i,}\mathcal{I}_i$, $i \in \{1,2\}$, $\ell \in \{1, \ldots, L\}$). Instead, using the vector of differences, the real variables to be found would 4L+3 ($|\delta_\alpha|$, $\angle\delta_\alpha$, $\delta_\tau$, $|\alpha_{B_1,}\mathcal{I}_i|$, $\angle\alpha_{B_1,}\mathcal{I}_i$, $\tau_{B_1,}\mathcal{I}_i$, $\mu_{B_1,}\mathcal{I}_i$, $\ell \in \{1, \ldots, L\}$), which is smaller than the previous case for every $L \in \mathbb{N}^*$. Nevertheless, the larger the number of multipath components L, the greater the benefit of using the vector of differences.

So far, we have considered a single set of time slots $\mathcal{T}$. However, since $\delta$ is assumed to be constant over time, we can estimate it using the channel realizations of different sets of time slots $\mathcal{T}^{(1)}, \ldots, \mathcal{T}^{(S)}$. In the general case, every set $\mathcal{T}^{(s)}$ may experience different multipath conditions from the others (for example, if it has been measured at a different location). Consequently, the parameters of the multipath components are different for every set s. In particular, we define $L^{(s)}$, $\alpha_\ell^{(s)}$, $\mu_\ell^{(s)}$ and $\tau_\ell^{(s)}$ as the parameters of the multipath components corresponding to the channel model $\mathcal{G}^{(s)}(t_n, f_k)$ of the s-th set of time slots.

Considering more sets of observations instead of only one allows us to mitigate the effects of noise and thus enhances the estimation of the vector of differences and, consequently, of the parameters of the multipath components.

Optimization

In order to estimate the characteristics of the multipath components and the vector of differences $\delta$, we resort to the maximum likelihood method, which, assuming Gaussian noise, reduces to the Non-Linear Least Squares (NLLS) method. Moreover, as explained above, we can exploit different sets of time slots, which are useful to improve the estimation of $\delta$. The NLLS problem becomes:

$$\min_{\tau,\mu,\alpha,\delta} \sum_{s=1}^{S} \sum_{t_n \in \mathcal{T}^{(s)}} \left( \sum_{f_k \in B_1} |\mathcal{G}^{(s)}(t_n, f_k) - H_1^{(s)}(t_n, f_k)|^2 + \right. \quad (7)$$

$$\left. \sum_{f_k \in B_2} |1/\delta_\alpha e^{-j2\pi f_k \delta_\tau} \mathcal{G}^{(s)}(t_n, f_k) - H_2^{(s)}(t_n, f_k)|^2 \right)$$

$$= \min_{\tau,\mu,\alpha,\delta} \sum_{s=1}^{S} \sum_{t_n \in \mathcal{T}^{(s)}} \left( \sum_{f_k \in B_1} |\mathcal{G}^{(s)}(t_n, f_k) - H_1^{(s)}(t_n, f_k)|^2 + \right. \quad (8)$$

$$\left. \frac{1}{|\delta_\alpha|^2} \sum_{f_k \in B_2} |\mathcal{G}^{(s)}(t_n, f_k) - \delta_\alpha e^{j2\pi f_k \delta_\tau} H_2^{(s)}(t_n, f_k)|^2 \right).$$

where $\mathcal{T}^{(s)}$ is the set of time slots corresponding to the set s, $\tau$ is defined as $\langle \tau^{(1)}, \ldots, \tau^{(S)} \rangle$, with $\tau^{(s)} = \langle \tau_1^{(s)}, \ldots, \tau_{L^{(s)}}^{(s)} \rangle$ and similarly for $\mu$ and $\alpha$. The first term corresponds to the data observed in the frequency band $B_1$, whereas the second term corresponds to the data observed in $B_2$. Solving Eq. (8) optimally is computationally demanding in the general case and thus we resort to suboptimal approaches. Below, we will describe how to solve Eq. (8) in two steps, and then explain how to put them together.

Since bands $B_1$ and $B_2$ are disjoint and $H_i(t_n, f_k) = 0$, $\forall f_k \notin B_i, i \in \{1,2\}$, Eq. (8) can be rewritten as $$\min_{\tau,\mu,\alpha,\delta} \sum_{s=1}^{S} \sum_{t_n \in \mathcal{T}^{(s)}} \left( \sum_{f_k \in B_1} |\mathcal{G}^{(s)}(t_n, f_k) - H^{(s)}(t_n, f_k, \delta)|^2 + \right. \quad (9)$$

$$\left. \frac{1}{|\delta_\alpha|^2} \sum_{f_k \in B_2} |\mathcal{G}^{(s)}(t_n, f_k) - H^{(s)}(t_n, f_k, \delta)|^2 \right)$$

$$= \min_{\tau,\mu,\alpha,\delta} \sum_{s=1}^{S} \sum_{t_n \in \mathcal{T}^{(s)}} \sum_{f_k \in B_1 \cup B_2} \chi(f_k) |\mathcal{G}^{(s)}(t_n, f_k) - H^{(s)}(t_n, f_k, \delta)|^2, \quad (10)$$

with $$\chi(f_k) = \begin{cases} 1, & \text{if } f_k \in B_1, \\ 1/|\delta_\alpha|^2, & \text{if } f_k \in B_2, \end{cases} \quad (11)$$

and $H^{(s)}(t_n, f_k, \delta) = H_1^{(s)}(t_n, f_k) + \delta_\alpha e^{j2\pi f_k \delta_\tau} H_2^{(s)}(t_n, f_k)$ is the composite CFR function. The crucial point in Eq. (10) is that $\delta$ does not depend on the index of the sets s—that is, as explained already above, the vector of differences is independent of the set of observations. Therefore, the problem can be rewritten as:

$$\min_{\delta} \sum_{s=1}^{S} \min_{\tau^{(s)},\mu^{(s)},\alpha^{(s)}} \sum_{t_n \in \mathcal{T}^{(s)}} \sum_{f_k \in B_1 \cup B_2} \chi(f_k) \quad (12)$$

$$|\mathcal{G}^{(s)}(t_n, f_k) - H^{(s)}(t_n, f_k, \delta)|^2.$$

For the s-th set of observations, the problem to solve is $$f^{(s)}(\delta) \min_{\tau^{(s)},\mu^{(s)},\alpha^{(s)}} \sum_{t_n \in \mathcal{T}^{(s)}} \sum_{f_k \in B_1 \cup B_2} \chi(f_k) \qquad (13)$$

$$\left| \left( \sum_{\ell=1}^{L^{(s)}} \alpha_\ell^{(s)} e^{-j2\pi(\mu_\ell^{(s)} t_n - f_k \tau_\ell^{(s)})} \right) - H^{(s)}(t_n, f_k, \delta) \right|^2,$$

where we have replaced $\mathcal{G}^{(s)}$ with its definition given in Eq. (1). Vector $\delta$ is not an optimization variable of Eq. (13). Therefore, Eq. (13) is a weighted spectral estimation problem, which can be solved optimally when there is one path only, or suboptimally in the general case $L^{(s)} > 1$ using SAGE or other algorithms.

Note that the composite channel frequency response function is defined starting from the CFRs of the two frequency bands along with the vector of differences. In particular, the phase difference, namely $\angle \delta_\alpha$, appears in the definition of $H^{(s)}(t_n, f_k, \delta)$; this allows us to consider the two frequency bands coherently, and thus to exploit a larger bandwidth, which in turn will improve the precision and provide better performance than considering the two bands disjointly.

Although we know how to solve Eq. (13), if we also wanted to find the optimal $\delta^*$ and thus solve the initial problem of Eq. (8), we would need to solve $$\min_\delta \sum_{s=1}^S f^{(s)}(\delta) = \min_{\delta_\tau, |\delta_\alpha|, \angle \delta_\alpha} \sum_{s=1}^S f^{(s)}(\langle \delta_\tau, |\delta_\alpha| e^{j\angle \delta_\alpha} \rangle), \qquad (14)$$

which is computationally demanding, as it involves a three dimensional optimization and the computation of $f^{(s)}(\delta)$ for every s and for every different $\delta$. Thus, the optimal solution for all parameters cannot be easily found.

Instead of trying to optimize the parameters of the multipath components first (as implied above), we start with optimizing the vector of differences. In this section, we drop the indices for ease of notation, when appropriate. Eq. (8) can be rewritten as:

$$\min_{\tau,\mu,\alpha,\delta} \left( \sum_{s,t_n,f_k \in B_1} |\mathcal{G} - H_1|^2 + \frac{1}{|\delta_\alpha|^2} \sum_{s,t_n,f_k \in B_2} |\mathcal{G} - \delta_\alpha e^{j2\pi f_k \delta_\tau} H_2|^2 \right) \qquad (15)$$

$$= \min_{\tau,\mu,\alpha} \left( \sum_{s,t_n,f_k \in B_1} |\mathcal{G} - H_1|^2 + \right. \qquad (16)$$

$$\left. \min_\delta \frac{1}{|\delta_\alpha|^2} \sum_{s,t_n,f_k \in B_2} |\mathcal{G} - \delta_\alpha e^{j2\pi f_k \delta_\tau} H_2|^2 \right)$$

because the first term does not depend on $\delta$. We now focus on the last term of the previous equation (written with all indices):

$$h(\tau, \mu, \alpha) = \min_\delta \sum_{s=1}^S \sum_{t_n \in \mathcal{T}^{(s)}} \sum_{f_k \in B_2} \qquad (17)$$

$$|1/\delta_\alpha e^{-j2\pi f_k \delta_\tau} \mathcal{G}^{(s)}(t_n, f_k) - H_2^{(s)}(t_n, f_k)|^2.$$

From Eq. (17) we can derive the optimal vector of differences. The problem is linear in $\delta_\alpha$ and not linear in $\delta_\tau$.

The optimal $\delta^*_\alpha$ can be found as a function of $\delta_\tau$ (that is, $\delta^*_\alpha = \delta^*_\alpha(\delta_\tau)$) by using the orthogonality principle for the linear least squares:

$$\sum_{s,t_n,f_k \in B_2} \mathcal{G}^* 1/(\delta_\alpha^*)^* e^{j2\pi f_k \delta_\tau} H_2 = \sum_{s,t_n,f_k \in B_2} H_2^* H_2 \qquad (18)$$

$$\sum_{s,t_n,f_k \in B_2} \mathcal{G}^* 1/(\delta_\alpha^*)^* e^{j2\pi f_k \delta_\tau} H_2 = \sum_{s,t_n,f_k \in B_2} |H_2|^2 \qquad (19)$$

$$\sum_{s,t_n,f_k \in B_2} \mathcal{G}^* e^{j2\pi f_k \delta_\tau} H_2 = (\delta_\alpha^*)^* \sum_{s,t_n,f_k \in B_2} |H_2|^2 \qquad (20)$$

$$\delta_\alpha^* = \left( \frac{\sum_{s,t_n,f_k \in B_2} \mathcal{G}^* e^{j2\pi f_k \delta_\tau} H_2}{\sum_{s,t_n,f_k \in B_2} |H_2|^2} \right)^* \qquad (21)$$

$$\delta_\alpha^* = \frac{\sum_{s,t_n,f_k \in B_2} \mathcal{G} e^{-j2\pi f_k \delta_\tau} H_2^*}{\sum_{s,t_n,f_k \in B_2} |H_2|^2} \qquad (22)$$

$$\delta_\alpha^* = \frac{\sum_{s,t_n} DFT_{f_k \in B_2 \to \delta_\tau}(\mathcal{G} H_2^*)}{\sum_{s,t_n,f_k \in B_2} |H_2|^2} \qquad (23)$$

We now focus on the optimization of $\delta_\tau$, starting from Eq. (17):

$$\delta_\tau^* = \operatorname*{argmin}_{\delta_\tau} \left( \sum_{s,t_n,f_k \in B_2} (|\mathcal{G}|^2 |1/\delta_\alpha^*(\delta_\tau)|^2 + \qquad (24)\right.$$

$$\left. |H_2|^2 - 2\mathcal{R}\{1/(\delta_\alpha^*(\delta_\tau))^* e^{j2\pi f_k \delta_\tau} H_2 \mathcal{G}^*\}) \right)$$

$$= \operatorname*{argmin}_{\delta_\tau} \left( \sum_{s,t_n,f_k \in B_2} (|\mathcal{G}|^2 |1/\delta_\alpha^*(\delta_\tau)|^2 - \qquad (25)\right.$$

$$\left. 2\mathcal{R}\{1/(\delta_\alpha^*(\delta_\tau))^* e^{j2\pi f_k \delta_\tau} H_2 \mathcal{G}^*\}) \right)$$

$$= \operatorname*{argmin}_{\delta_\tau} \left( |1/\delta_\alpha^*(\delta_\tau)|^2 \sum_{s,t_n,f_k \in B_2} |\mathcal{G}|^2 - \qquad (26)\right.$$

$$\left. \sum_{s,t_n,f_k \in B_2} 2\mathcal{R}\{1/(\delta_\alpha^*(\delta_\tau))^* e^{j2\pi f_k \delta_\tau} H_2 \mathcal{G}^*\} \right).$$

The last term can be rewritten using the expression of $\delta^*_\alpha(\delta_\tau)$ derived in Eq. (22):

$$\sum_{s,t_n,f_k \in B_2} 2\mathcal{R}\{1/(\delta_\alpha^*(\delta_\tau))^* e^{j2\pi f_k \delta_\tau} H_2 \mathcal{G}\} \qquad (27)$$

$$= 2\mathcal{R}\left\{ 1/(\delta_\alpha^*(\delta_\tau))^* \sum_{s,t_n,f_k \in B_2} (\delta_\alpha^*(\delta_\tau))^* e^{j2\pi f_k \delta_\tau} H_2 \mathcal{G}^* \right\} \qquad (28)$$

$$= 2\mathcal{R}\left\{ \frac{\sum_{s,t_n,f_k \in B_2} |H_2|^2}{\sum_{s,t_n,f_k \in B_2} \mathcal{G} e^{-j2\pi f_k \delta_\tau} H_2^*} \sum_{s,t_n,f_k \in B_2} (\delta_\alpha^*(\delta_\tau))^* e^{j2\pi f_k \delta_\tau} H_2 \mathcal{G}^* \right\} \qquad (29)$$

$$= 2\mathcal{R}\left\{ \sum_{s,t_n,f_k \in B_2} |H_2|^2 \right\} \qquad (30)$$

$$= 2 \sum_{s,t_n,f_k \in B_2} |H_2|^2, \qquad (31)$$

The last expression does not depend upon $\delta_\tau$. Therefore, we can rewrite Eq. (26) as:

$$\delta_\tau^* = \operatorname*{argmin}_{\delta_\tau} \left( |1/\delta_\alpha^*(\delta_\tau)|^2 \sum_{s,t_n,f_k \in B_2} |\mathcal{G}|^2 - 2 \sum_{s,t_n,f_k \in B_2} |H_2|^2 \right) \qquad (32)$$

$$= \operatorname*{argmin}_{\delta_\tau} \left( |1/\delta_\alpha^*(\delta_\tau)|^2 \sum_{s,t_n,f_k \in B_2} |\mathcal{G}|^2 \right) \qquad (33)$$

$$= \operatorname*{argmin}_{\delta_\tau} \left( \left| \frac{\sum_{s,t_n,f_k \in B_2} |H_2|^2}{\sum_{s,t_n,f_k \in B_2} \mathcal{G} e^{-j2\pi f_k \delta_\tau} H_2^*} \right|^2 \sum_{s,t_n,f_k \in B_2} |\mathcal{G}|^2 \right) \qquad (34)$$

-continued $$= \underset{\delta_\tau}{\operatorname{argmin}} \left( \frac{\left(\sum_{s,t_n,f_k \in B_2} |H_2|^2\right)^2 \sum_{s,t_n,f_k \in B_2} |\mathcal{G}|^2}{\left|\sum_{s,t_n,f_k \in B_2} \mathcal{G} e^{-j2\pi f_k \delta_\tau} H_2^*\right|} \right) \quad (35)$$

$$= \underset{\delta_\tau}{\operatorname{argmin}} \left( \frac{\left(\sum_{s,t_n,f_k \in B_2} |H_2|^2\right)^2 \sum_{s,t_n,f_k \in B_2} |\mathcal{G}|^2}{\left|\sum_{s,t_n} DFT_{f_k \in B_2 \to \delta_\tau}(\mathcal{G} H_2^*)\right|^2} \right) \quad (36)$$

$$= \underset{\delta_\tau}{\operatorname{argmin}} \left| \sum_{s,t_n} DFT_{f_k \in B_2 \to \delta_\tau}(\mathcal{G} H_2^*) \right|^2, \quad (37)$$

which can be solved by exploiting the FFT algorithm.

According to the optimal expressions of $\delta^*_\alpha$ and $\delta^*_\tau$ derived in Eq. (23) and Eq. (37), we conclude that Eq. (17) can be solved efficiently—that is, once the parameters of the multipath parameters $\tau$, $\mu$, $\alpha$ are fixed, we know how to find the optimal $\delta^*$. If we also wanted to find the optimal $\tau^*$, $\mu^*$, $\alpha^*$ and thus solve the initial Problem (8), we would need to solve $$\min_{\tau,\mu,\alpha} \left( h(\tau, \mu, \alpha) + \sum_{f_k \in B_1} \sum_{s=1}^{S} \sum_{t_n \in \mathcal{T}^{(s)}} |\mathcal{G}^{(s)}(t_n, f_k) - H_1^{(s)}(t_n, f_k)|^2 \right), \quad (38)$$

which however is computationally demanding. Thus, the optimal solution for all parameters cannot be easily found.

In the preceding passages, it has not been possible to find the optimal solution for all the optimization variables $\tau$, $\mu$, $\alpha$ and $\delta$. Thus, we resort to suboptimal approaches. Given the structure of $f(\delta)$ and $h(\tau, \mu, \alpha)$ defined in Eq. (13) and (17), respectively, we build an alternate optimizer which iteratively solves the two problems separately. That is, it repeatedly optimizes the parameters of the multipath components and then the vector of differences independently. The corresponding pseudocode algorithm is as follows:

---
Algorithm 1 Dual Band Estimation Algorithm
---
1: procedure Estimation ($H_1$, $H_2$)
2:    Init $\delta_0 = \langle \delta_{0,\tau}, \delta_{0,\alpha} \rangle$
3:    i ← 1
4:    while i = 1 or $|\delta_i - \delta_{i-1}| > \epsilon$ do
5:      // Optimize multipath components
6:      for s ∈ {1, ..., S} do
7:         for $t_n \in \mathcal{T}^{(s)}$ do
8:            for $f_k \in B_1 \cup B_2$ do
9:               $H_i^{(s)}(t_n, f_k) \leftarrow H_1^{(s)}(t_n, f_k) + \delta_{i-1,\alpha} e^{j2\pi f_k \delta_{i-1,\tau}} H_2^{(s)}(t_n, f_k)$
10:      $\langle \tau_i^{(s)}, \mu_i^{(s)}, \alpha_i^{(s)} \rangle \leftarrow$ SAGE ($H_i^{(s)}$)
11:
12:      // Optimize vector of differences
13:      for s ∈ {1, ..., S} do
14:         $L_i^{(s)} \leftarrow$ Length ($\tau_i^{(s)}$)
15:         for $t_n \in \mathcal{T}^{(s)}$ do
16:            for $f_k \in B_1 \cup B_2$ do 17:               $\mathcal{G}^{(s)}(t_n, f_k) \leftarrow \sum_{\ell=1}^{L_i^{(s)}} \alpha_{i,\ell}^{(s)} e^{-j2\pi(\mu_{i,\ell}^{(s)} t_n - f_k \tau_{i,\ell}^{(s)})}$ 18:      $\delta_{i,\tau} \leftarrow \underset{\delta_\tau}{\arg\max} \left| \sum_{s=1}^{S} \sum_{t_n \in \mathcal{T}^{(s)}} DFT_{f_k \in B_2 \to \delta_\tau}(\mathcal{G}^{(s)}(t_n, f_k)(H_2^{(s)}(t_n, f_k))^*) \right|^2$ 19:      $\delta_{i,\alpha} \leftarrow \dfrac{\sum_{s=1}^{S} \sum_{t_n \in \mathcal{T}^{(s)}} DFT_{f_k \in B_2 \to \delta_{i,\tau}}(\mathcal{G}^{(s)}(t_n, f_k)(H_2^{(s)}(t_n, f_k))^*)}{\sum_{s=1}^{S} \sum_{t_n \in \mathcal{T}^{(s)}} \sum_{f_k \in B_2} |H_2^{(s)}(t_n, f_k)|^2}$ 20:
21:    i ← i + 1
22:    return $\langle \delta_i, \tau_i, \mu_i, \alpha_i \rangle$ First, the algorithm starts with an initial vector of differences $\delta_0$ (Line 2). Vector $\delta_0$ can be set to an arbitrary value or initialized with a coarse estimation of the vector of differences obtained from the correlation of the two channel impulse responses. Then, the algorithm repeats the same sequence of operations (Lines 5-21) until $\delta_i$ converges within an accuracy $\epsilon$. Variable i represents the index of the iterations of the algorithm. The core of the algorithm is divided in two parts: the optimization of the parameters of the multipath components (Lines 5-10), and the optimization of the vector of differences (Lines 12-19), both of which proceed as described already above.

In the first part, for every set of observations s ∈ {1, ..., S}, the composite CFR function $H_i^{(s)}$ is evaluated (Line 9). Note that $H_i^{(s)}$ is computed from the composition of the two channel frequency responses along with the old estimation of the vector of differences $\delta_{i-1}$. Given the composite CFR, the parameters of the multipath components can be derived using known estimation algorithms such as SAGE.

In the second part, once the parameters of the multipath components have been derived, the new vector of differences is found. First, function $\mathcal{G}^{(s)}$ (which represents the model of the composite channel computed using the estimated parameters of the multipath components) is derived for every set of observations s ∈ {1, ..., S}. Note that the number of multipath components of the set of observations s is evaluated in Line 14 according to the results of the first part. Then, $\delta_{i,\tau}$ and $\delta_{i,\alpha}$ are computed in Lines 18 and 19 using Eq. (37) and Eq. (23), respectively.

The output of the algorithm is the optimized vector of all parameters, which describes the underlying channel between transmitter and receiver and thus can be used to derive the ToA for positioning (or timing) purposes.

Second Model—Different Multipath Environments

In addition to the model presented in the previous sections, we also consider the case in which the CFRs $H_1$ and $H_2$ describe different multipath environments, except for the LoS component. Also in this case, we consider a misalignment in terms of transmission times, powers and phases. Therefore, instead of Eqs. (3)-(5), the following relations hold for every set of observations s ∈ {1, ..., S}:

$$\alpha_{B_2,1}^{(s)} = 1/\lambda_\alpha \cdot \alpha_{B_1,1}^{(s)}, \quad (39)$$

$$\tau_{B_2,1}^{(s)} = \tau_{B_1,1}^{(s)} - \lambda_\tau, \quad (40)$$

$$\mu_{B_2,1}^{(s)} = \mu_{B_1,1}^{(s)}, \quad (41)$$

where $\lambda = \langle \lambda_\alpha, \lambda_\tau \rangle$ represents the vector of differences of the LoS component only. The subscript "1" identifies the LoS component in the previous equations.

The channel models can be rewritten as $$\mathcal{G}_1^{(s)}(t_n, f_k) = \underbrace{\alpha_{B_1,1}^{(s)} e^{-j2\pi\left(\mu_{B_1,1}^{(s)} t_n - f_k \tau_{B_1,1}^{(s)}\right)}}_{LoS_{B_1}^{(s)}(t_n,f_k)} + \underbrace{\sum_{\ell=2}^{L_{B_1}^{(s)}} \alpha_{B_1,\ell}^{(s)} e^{-j2\pi\left(\mu_{B_1,\ell}^{(s)} t_n - f_k \tau_{B_1,\ell}^{(s)}\right)}}_{NLoS_{B_1}^{(s)}(t_n,f_k)} \quad (42)$$

$$\mathcal{G}_2^{(s)}(t_n, f_k) = \frac{e^{-j2\pi f_k \lambda_\tau}}{\lambda_\alpha} \underbrace{\alpha_{B_1,1}^{(s)} e^{-j2\pi\left(\mu_{B_1,1}^{(s)} t_n - f_k \tau_{B_1,1}^{(s)}\right)}}_{LoS_{B_1}^{(s)}(t_n,f_k)} + \quad (43)$$

$$\underbrace{\phantom{\frac{}{}}}_{LoS_{B_2}^{(s)}(t_n,f_k)}$$

$$\underbrace{\left(\sum_{\ell=2}^{L_{B_2}^{(s)}} \alpha_{B_2,\ell}^{(s)} e^{-j2\pi\left(\mu_{B_2,\ell}^{(s)} t_n - f_k \tau_{B_2,\ell}^{(s)}\right)}\right)}_{NLoS_{B_1}^{(s)}(t_n,f_k)}$$

The NLLS optimization problem becomes the following (where we omit the indices for ease of notation):

$$\min_{\tau,\mu,\alpha,\lambda}\left(\sum_{s,t_n,f_k\in B_1}|\mathcal{G}_1 - H_1|^2 + \sum_{s,t_n,f_k\in B_2}|\mathcal{G}_2 - H_2|^2\right) = \quad (44)$$

$$\min_{\tau,\mu,\alpha,\lambda}\left(\sum_{s,t_n,f_k\in B_1}|LoS_{B_1} + NLoS_{B_1} - H_1|^2 + \right.$$

$$\left.\sum_{s,t_n,f_k\in B_2}|LoS_{B_2} + NLoS_{B_2} - H_2|^2\right)$$

$$= \min_{\tau,\mu,\alpha,\lambda}\left(\sum_{s,t_n,f_k\in B_1}|LoS_{B_1} + NLoS_{B_1} - H_1|^2 + \right. \quad (45)$$

$$\left.\sum_{s,t_n,f_k\in B_2}\left|\frac{e^{-j2\pi f_k \lambda_\tau}}{\lambda_\alpha} LoS_{B_2} + NLoS_{B_2} - H_2\right|^2\right)$$

This is more difficult to solve than Eq. (8), as the structure of the problem is the same but there are more optimization variables. Nevertheless, the problem can be solved in three iterative steps:

Optimization of the vector of differences.
Optimization of the LoS component.
Optimization of the NLoS components.

To optimise the vector of differences, we assume (as above) that the parameters of the multipath components have been fully characterized—that is, vectors $\tau$, $\mu$ and $\alpha$ are given—and aim at finding $\lambda$. From Eq. (45), we derive the optimal vector of differences of the LoS component as:

$$\lambda^* = \underset{\lambda}{\operatorname{argmin}}\left(\sum_{s,t_n,f_k\in B_1}|LoS_{B_1} + NLoS_{B_1} - H_1|^2 + \right. \quad (46)$$

$$\left.\sum_{s,t_n,f_k\in B_1}\left|\frac{e^{-j2\pi f_k \lambda_\tau}}{\lambda_\alpha} LoS_{B_2} + NLoS_{B_2} - H_2\right|^2\right) =$$

$$\underset{\lambda}{\operatorname{argmin}}\left(\sum_{s,t_n,f_k\in B_2}|1/\lambda_\alpha e^{-j2\pi f_k \lambda_\tau} LoS_{B_1} + NLoS_{B_2} - H_2|^2\right)$$

The structure of Eq. (46) is identical to that of Eq. (17). Therefore, the same solution can be simply derived by replacing $H_2^{(s)}(t_n,f_k)$ with $H_2^{(s)}(t_n,f_k)-NLoS_{B_2}^{(s)}(t_n,f_k)$ and $\mathcal{G}^{(s)}(t_n,f_k)$ with $LoS_{B_1}^{(s)}(t_n,f_k)$.

In order to find the LoS component, we introduce a different model of the channel for the two frequency bands:

$$\tilde{\mathcal{G}}_1^{(s)}(t_n, f_k) = \tilde{\mathcal{G}}^{(s)}(t_n, f_k) = LoS^{(s)}(t_n, f_k) + NLoS^{(s)}(t_n, f_k), \quad (47)$$

$$\tilde{\mathcal{G}}_2^{(s)}(t_n, f_k) = \quad (48)$$

$$\frac{e^{-j2\pi f_k \lambda_\tau}}{\lambda_\alpha}(LoS^{(s)}(t_n, f_k) + NLoS^{(s)}(t_n, f_k)) = \frac{e^{-j2\pi f_k \lambda_\tau}}{\lambda_\alpha}\tilde{\mathcal{G}}^{(s)}(t_n, f_k).$$

Function $\tilde{\mathcal{G}}^{(s)}(t_n,f_k)$ is specified for both bands (i.e., $f_k\in B_1\cup B_2$) and so are $LoS^{(s)}(t_n,f_k)$ and $NLoS^{(s)}(t_n,f_k)$. In particular, $LoS^{(s)}(t_n,f_k)$ represents the line-of-sight component, common to both $B_1$ and $B_2$ (except for the vector of differences $\lambda$), whereas $NLoS^{(s)}(t_n,f_k)$ corresponds to the composition of the non-line-of-sight components of both bands and thus it represents neither the NLoS components of $B_1$ nor to the ones of $B_2$. Using $\tilde{\mathcal{G}}^{(s)}(t_n,f_k)$ and assuming that $\lambda$ is given, the optimization problem of Eq. (45) becomes $$\sum_{s=1}^{S} \min_{\tau^{(s)},\mu^{(s)},\alpha^{(s)}} \sum_{t_n\in\mathcal{T}^{(s)}} \sum_{f_k\in B_1\cup B_2} \chi(f_k) \quad (49)$$

$$\left|\tilde{\mathcal{G}}^{(s)}(t_n, f_k) - H^{(s)}(t_n, f_k, \lambda)\right|^2.$$

where, as before, the composite CFR function $H^{(s)}(t_n,f_k,\lambda)$ is defined as $H_1^{(s)}(t_n,f_k,\lambda)+\lambda_\alpha e^{j2\pi f_k\lambda_\tau}H_2^{(s)}(t_n,f_k,\lambda)$, and $\chi(f_k)$ is defined in Eq. (11). Eq. (49) is identical to Eq. (12) and thus can be solved in the same manner as before.

Note that, although the NLoS components derived from Eq. (49) do not correspond to the channels of $B_1$ or $B_2$, the LoS component does. In particular, provided that $\lambda$ is accurate, the combined CFR function H coherently and constructively accumulates the LoS components of the two frequency bands. On the other hand, the NLoS components of the two bands are also combined coherently, but in an unknown fashion. That is, the combination may be constructive (worst case), destructive (best case) or in between. Nevertheless, note that also in the worst case in which the NLoS components are constructively combined, considering H is still beneficial since it provides a lower noise and a larger bandwidth than the two separate CFRs $H_1$ and $H_2$.

Once Eq. (49) has been solved, we set the parameters of the LoS component as $\tau_1^{(s)}=\tilde{\tau}_1^{(s)}$, $\mu_1^{(s)}=\tilde{\mu}_1^{(s)}$ and $\alpha_1^{(s)}=\tilde{\alpha}_1^{(s)}$, for every $s\in\{1,\ldots,S\}$, and discard the values of the NLoS components.

The third step in the iterative procedure is optimisation of the NLoS components. In this step, $\lambda$, $\tau_1^{(s)}$, $\mu_1^{(s)}$ and $\alpha_1^{(s)}$ are taken as known, and we aim at finding the parameters of the NLoS components only.

Since there is no relation between the NLoS components of the two frequency bands, the problem can be solved fairly easily by looking at $H_1$ and $H_2$ independently and applying a spectral estimation algorithm (for example, SAGE) to both bands.

Embodiments

Embodiments of the invention will now be described, with reference to FIGS. 8-16.

Figure 8:
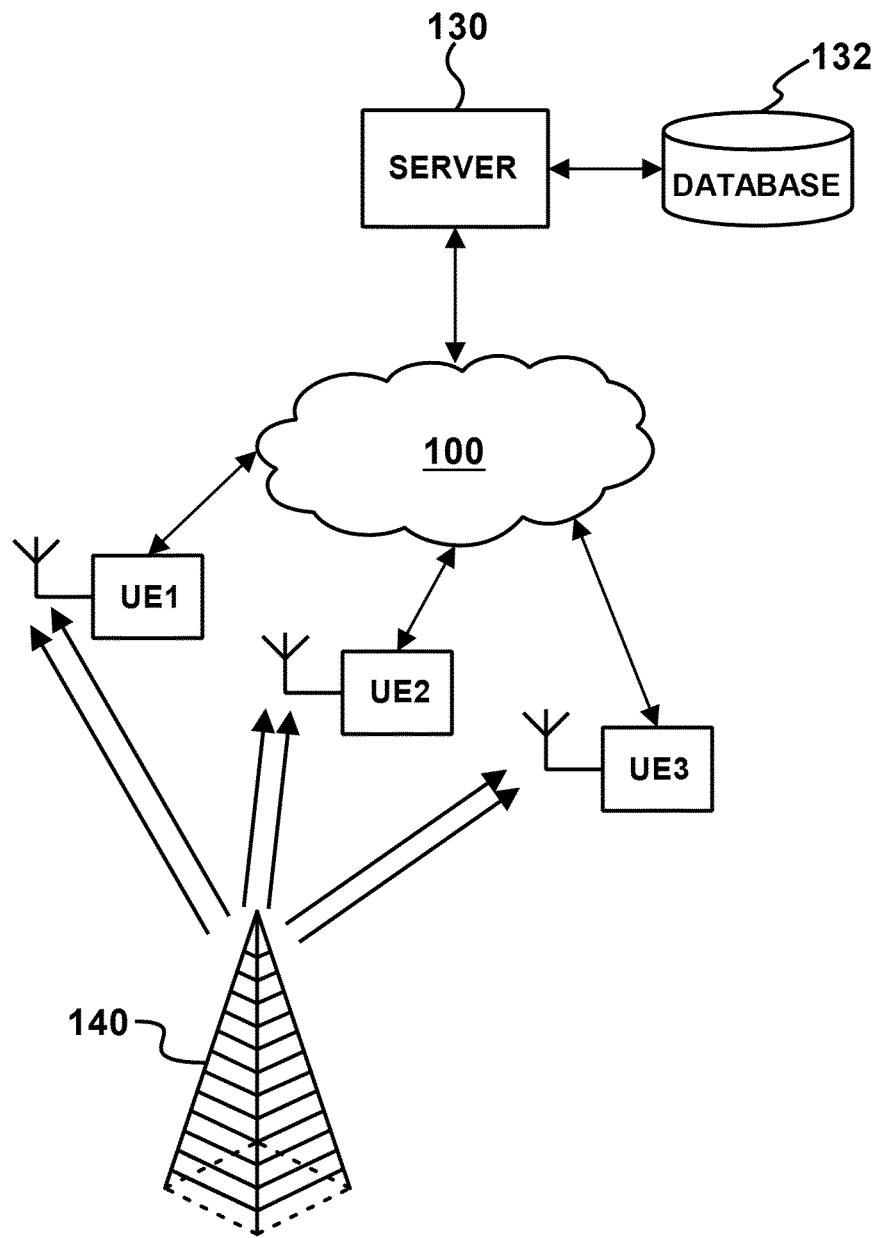
FIG. 8 is a schematic block diagram showing UEs operating according to an embodiment of the invention.

FIG. 8 is a schematic block diagram showing three UEs operating according to an embodiment. In this example, each of the UEs belongs to a wireless infrastructure network; however, this is not essential and the UEs may be replaced by other electronic communications devices, in other embodiments.

Three UEs (UE1, UE2, and UE3) are shown, for the purposes of explanation. In a full positioning system there may be more devices. However, in some embodiments, there may be as little as one UE. Each UE is able to receive signals transmitted from one or more antennas on a mast 140. Although these signals are transmitted from the same location (and possibly even the same antenna), they are from base stations serving different cells, which may be in different cellular networks. There is therefore no predetermined timing, phase, or amplitude relationship between the signals.

All of the UEs are connected (typically via their own BSs, which are not shown) to network 100, as indicated by the double-headed arrows in the drawing. This network 100 may for example include portions of backhaul network, backbone network, and the global internet. The UEs can connect to a server computer 130 via the network 100. The UEs may also connect to one another via the network 100. A positioning engine runs on the server computer 130. This may be implemented in hardware or software, or both. The positioning engine may be responsible for positioning (or timing) calculations, in various embodiments. The server 130 may also be responsible for providing various services to the UEs, such as managing a database 132 of signals that are transmitted from the same location and the characteristic differences between them.

Figure 9:
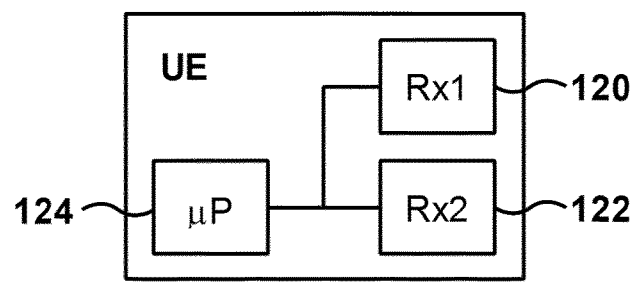
FIG. 9 is a schematic block diagram of a UE.

As illustrated in FIG. 9, each UE comprises a first receiver 120, a second receiver 122, and a processor 124. The first receiver 120 is configured to receive a first wireless signal transmitted from the mast 140. The second receiver 122 is configured to receive a second wireless signal transmitted from the mast 140. In this example, both the first and second wireless signals are downlink signals; however, this is not essential.

The first wireless signal is transmitted in a first frequency range and the second wireless signal is transmitted in a second frequency range, spaced from the first. Thus, the two frequency ranges are neither overlapping nor immediately adjacent to one another. In the example of FIG. 9, the first and second receivers are illustrated as separate components. However, in other embodiments, they may be implemented as a single broadband receiver that is capable of receiving both frequency ranges simultaneously, or a single receiver that tunes to the first frequency range in one timeslot and tunes to the second frequency range in another timeslot.

Figure 10:
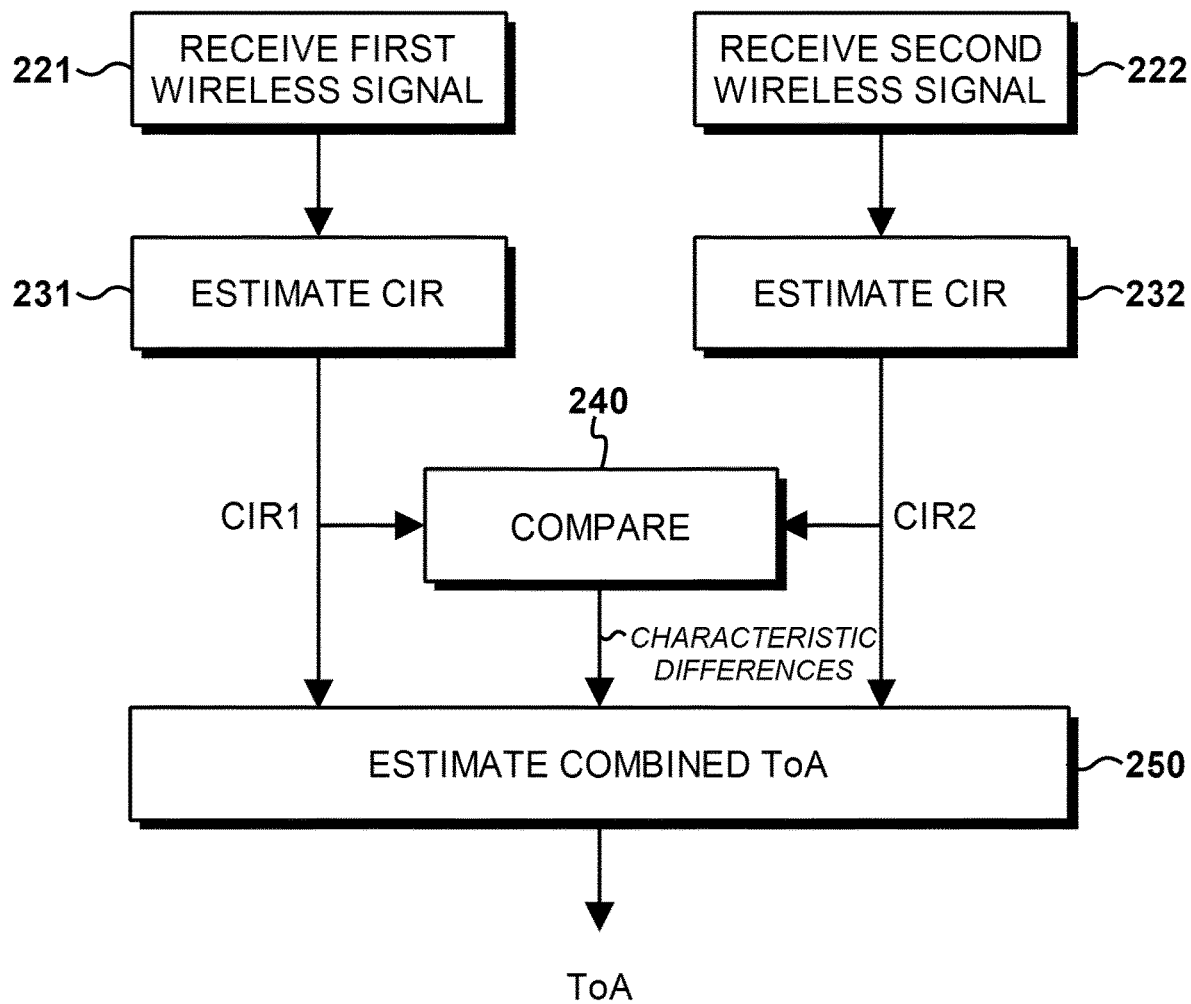
FIG. 10 is a flowchart illustrating a method of estimating a combined ToA according to an embodiment of the invention.

FIG. 10 is a flowchart of a method that can be performed by one of the UEs, according to an embodiment. In step 221, the first receiver 120 of the UE receives the first wireless signal. In step 222, the second receiver 122 of the UE receives the second wireless signal. These steps might or might not happen concurrently. In step 231, the processor 124 of the UE processes the received first wireless signal. This processing comprises estimating a first CIR from the first wireless signal. Similarly, in step 232, the processor 124 processes the second wireless signal to estimate a second CIR. In step 240, the processor 124 compares the first CIR with the second CIR to estimate one or more characteristic differences between the first and second wireless signals. In the present example, this comprises calculating a cross-correlation function between the two CIRs, and using this to determine a relative offset in the time of transmission of the two signals and a relative carrier phase relationship between them. Using the relative time and phase offsets determined in step 240, and the CIRs estimated in steps 231 and 232, the processor 124 estimates a combined ToA for the two signals, in step 250. In this example, the combined ToA is estimated by using the relative time and phase offsets to align the two CIRs; combining the aligned CIRs; and estimating the combined TOA from the combined CIRs. The aligned CIRs are combined by coherent summation. This simplified example assumes that the two wireless signals are transmitted with the same or similar amplitudes. In general, this might not be the case; therefore, the step 240 may further include estimating the relative amplitude relationship between the two signals.

In the example described above, it was assumed that all of the steps of the method were performed by a single electronic communications device, such as UE1 or UE2. This is not essential. Some of the steps may be performed by one or more other devices. For example, after UE1 receives the first and second wireless signals in steps 221 and 222, it may send data to another device to complete the processing. UE1 may send the received wireless signals to the other device. Alternatively, it may estimate the CIRs in steps 231 and 232, and send the CIRs to the other device. As a further alternative, UE1 may estimate the characteristic differences, and may send these to the other device. The other device may complete the processing of the intermediate products sent by UE1, and may estimate a combined ToA. The other device may be another electronic communications device, such as UE3, or may be the server 130 implementing the positioning engine and/or other supporting services.

Figure 11:
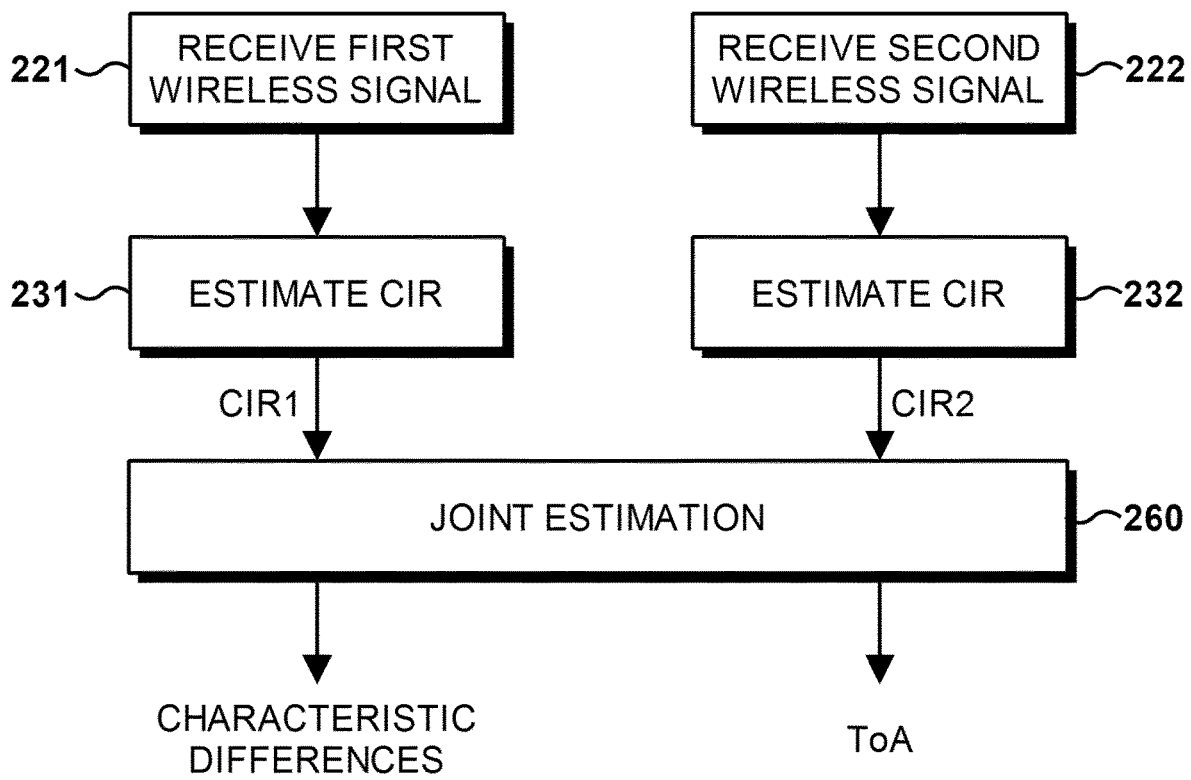
FIG. 11 is a flowchart illustrating a method of estimating a combined ToA according to another embodiment of the invention.

FIG. 11 illustrates a method according to another embodiment, which can be used as an alternative to the method of FIG. 10. In the method of FIG. 11, the initial steps 221, 222 of receiving the first and second wireless signals, and the steps 231, 232 of estimating the respective CIRs are the same as the method of FIG. 10. However, method of FIG. 11 differs in the way that the characteristic differences and combined ToA are estimated. In the method of FIG. 10, these were estimated sequentially—with the combined ToA being estimated based on the characteristic differences already estimated. In the method of FIG. 11, the characteristic differences and the combined ToA are estimated jointly, in step 260. This may allow improved estimation of some or all of the variables. In some embodiments, the joint estimation comprises estimating the characteristic differences and the combined ToA iteratively. This typically involves holding some variable(s) constant and estimating the remaining variable(s), and repeating this procedure for each of the variables in turn, until all the variables have converged to stable values.

Again, just as for the method of FIG. 10, the different steps of the method in FIG. 11 may be performed by the same device or different devices.

Figure 12:
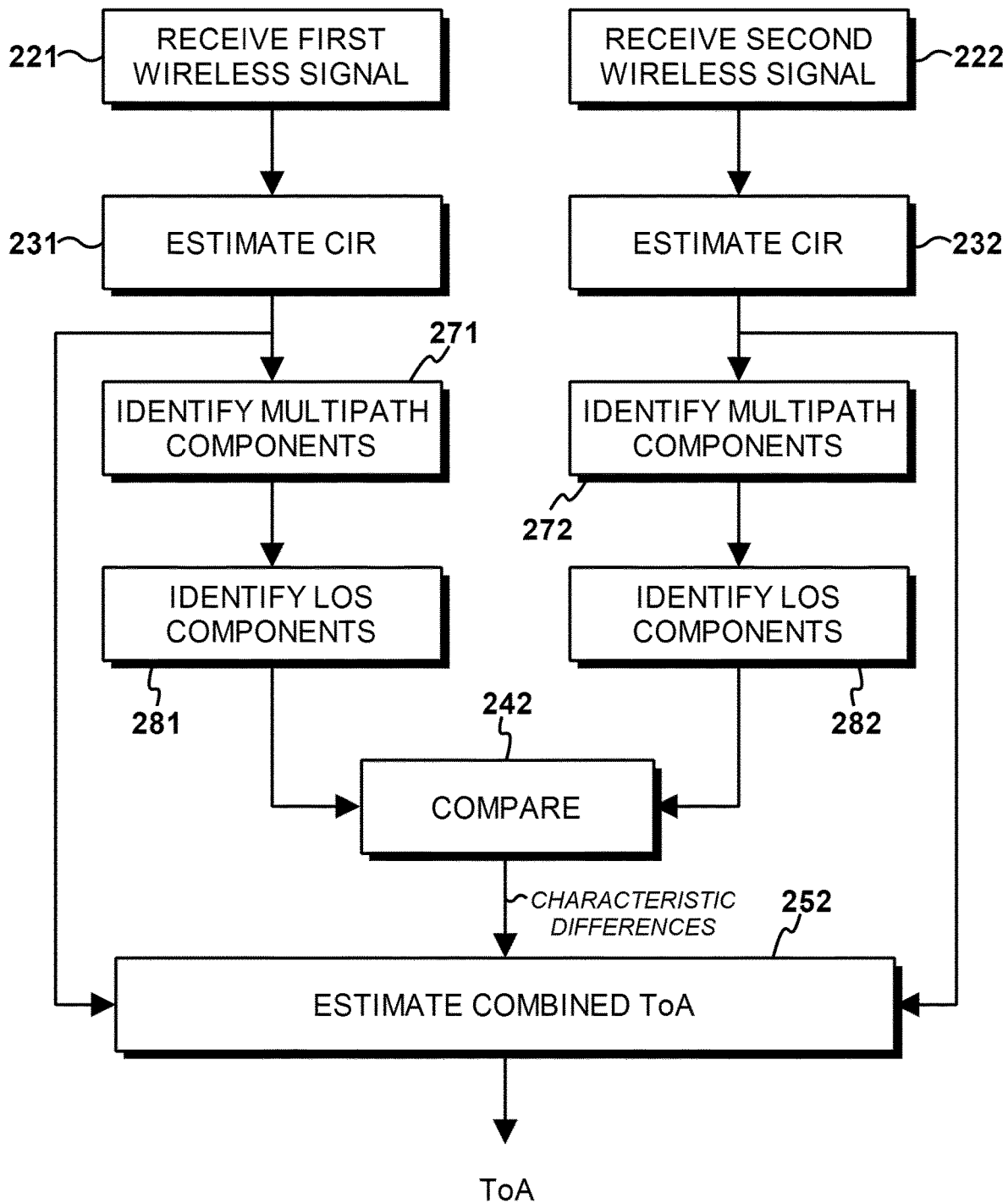
FIG. 12 is a flowchart illustrating a method of estimating a combined ToA according to a further embodiment of the invention.

FIG. 12 illustrates a method according to a further embodiment of the invention. The preliminary steps 221, 222, 231, 232 of receiving the wireless signals and estimating the CIRs are identical to the methods of FIG. 10 and FIG. 11. The method of FIG. 12 further comprises identifying, in step 271, one or more first multipath components in the first CIR and identifying, in step 272, one or more second multipath components in the second CIR. Each multipath component is characterised by a respective time delay. The one or more characteristic differences are then estimated, in step 242, based on the identified multipath components. In particular, the method comprises identifying, in step 281, a first line-of-sight (LoS) component from among the first multipath components; and identifying, in step 282, a second line-of-sight component from among the second multipath components. The LoS component may be selected as the multipath component having the shortest time delay and/or the largest amplitude, or by any other appropriate criterion. The method then comprises estimating the one or more characteristic differences, by comparing the line-of-sight components in step 242. The combined ToA can then be estimated, in step 252, based on these characteristic differences, in a similar manner to step 250, described above.

Figure 12A:
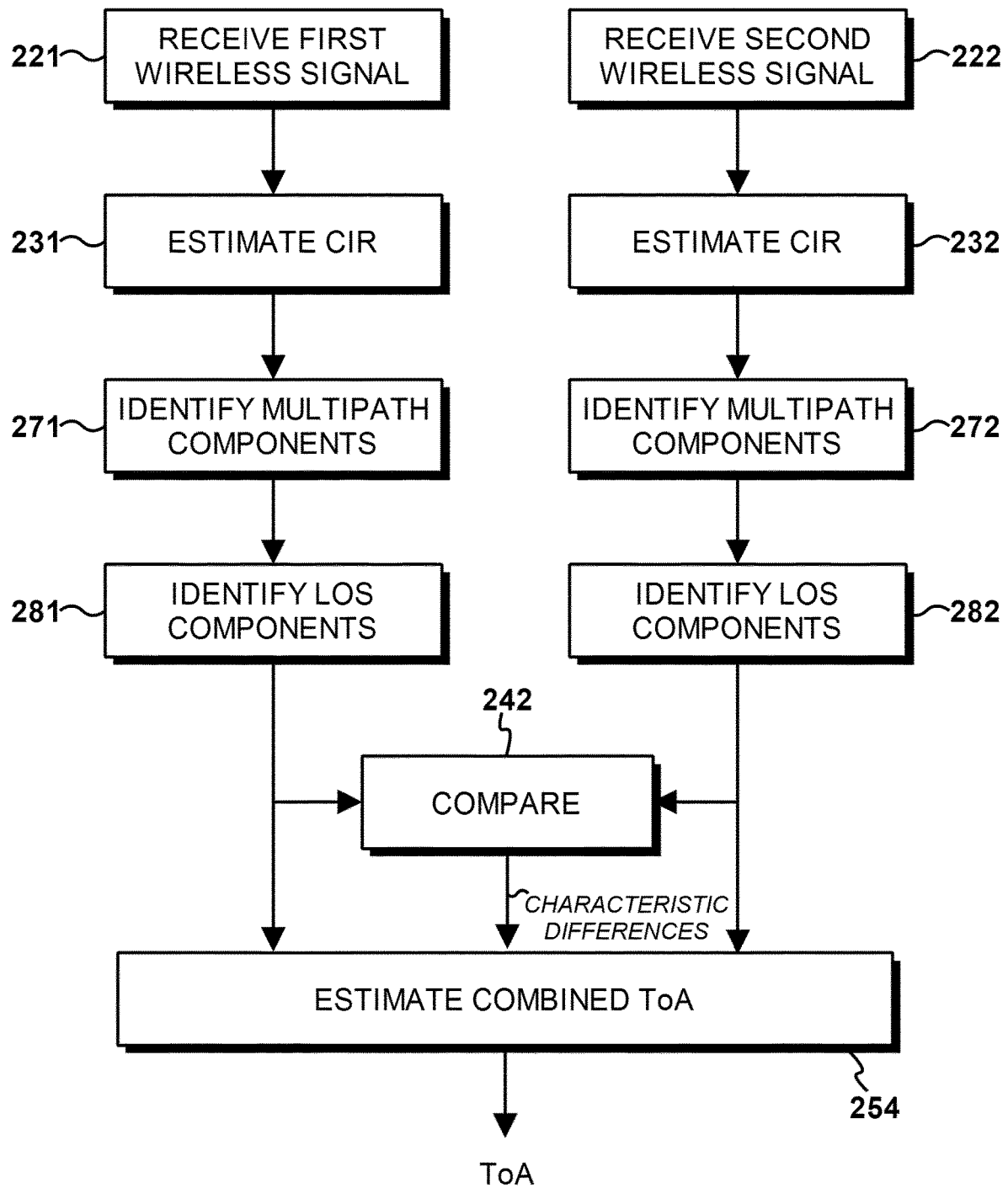
FIG. 12A is a flowchart for a variant of the method of FIG. 12.

In a variant of the method of FIG. 12, illustrated in FIG. 12A, the combined ToA is calculated differently. In this embodiment, after comparing the multipath components (in particular, the LoS components) to estimate the one or more characteristic differences, the multipath components are aligned, and the time of arrival is estimated from the aligned components. Since the multipath components are characterised by their time delays, this variant is appropriate when the characteristic difference of interest is the relative time difference between the first and second wireless signals.

Figure 13:
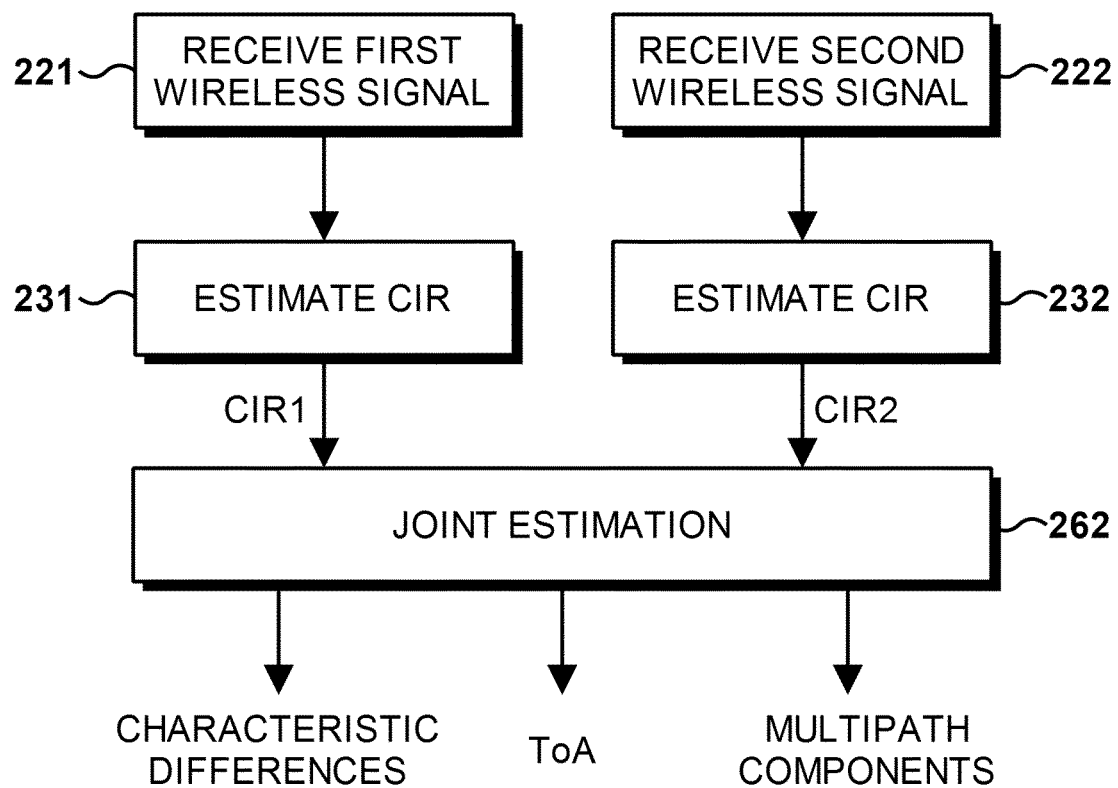
FIG. 13 is a flowchart illustrating a method of estimating a combined ToA according to still another embodiment of the invention.

FIG. 13 illustrates a method according to still another embodiment of the invention. This method is in one sense a hybrid of the method of FIG. 11 and FIG. 12, in that it uses both joint estimation and multipath components. Once again, the preliminary steps 221, 222, 231, and 232 of receiving the wireless signals and estimating the CIRs are the same as in the previous embodiments. In step 262, the method proceeds by jointly estimating the characteristic differences, the multipath components, and the combined ToA. In one embodiment, this can be done by iterative optimisation—in each iteration, holding some of the variables at their current values while optimising the values of other variables; and repeating this by cycling through the variables until they have all converged to stable values. Suitable mathematical models and optimization methods include those described previously, above.

As explained already for FIGS. 10 and 11, the steps of the methods of FIGS. 12 and 13 may be performed all by the same device, or by different devices.

Figure 14:
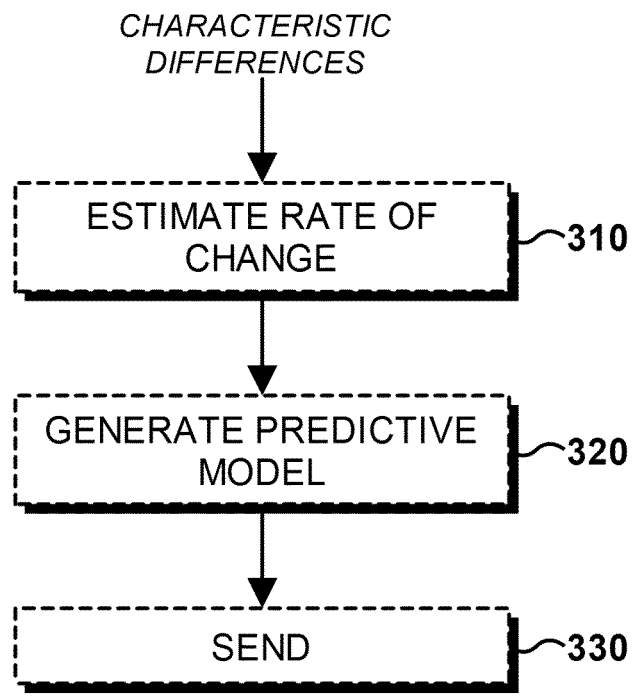
FIG. 14 is a flowchart showing optional steps that may be added to any of the methods of FIGS. 10-13.

FIG. 14 illustrates some optional additional steps that may be included in any of the methods of FIGS. 10-13. In some scenarios, for some combinations of signals, and for some characteristic differences, it may be reasonable to assume that the characteristic difference is substantially constant over a given time interval. However, in some other cases, this assumption might be inaccurate. Nevertheless, even in these situations, it is possible that the two wireless signals may be drifting relative to one another in a deterministic manner. In such cases, it may be possible to improve performance by taking into account the drift in the calculations. In step 310, the processor 124 of the UE (or the server 130) estimates a rate of change of at least one of the characteristic differences calculated in step 240, 260, 242, or 262. In step 320, the processor 124 (or the server 130) generates a model for predicting a value of the at least one characteristic difference, based on the estimated rate of change. This can allow future values of the characteristic difference to be predicted, in situations in which the values are changing. Having such a predictive model may allow the characteristic difference to be measured less frequently than it would otherwise need to be measured, because the predictive model can predict changes in the values.

Step 330 is an optional step of sending the estimated one or more characteristic differences to another device. This can assist the other device to estimate a combined ToA, based on the first and second wireless signal. Alternatively or in addition, it can allow the other device to build a database of pairs or groups of signals and their characteristic differences, which can be used to support that device or other devices estimating combined times of arrival. Optionally, step 330 may include sending a rate of change associated at least one of the characteristic differences, or sending parameters of a predictive model associated with at least one of the characteristic differences. If necessary, the estimated one or more characteristic differences may be corrected (as described already above), in order to compensate for receiver-generated differences, before sending to the other device. Alternatively or in addition, the method may further comprise sending, to the other device, an estimate of the receiver-generated differences. This can allow the other device to compensate for these receiver-generated differences. Correction to compensate for receiver-generated differences can help to improve the accuracy and usefulness of the estimated characteristic differences, for the other device.

The other device (to which the one or more characteristic differences, rates of change, and/or model parameters are sent) may be another electronic communications device, such as another UE, or it may be a server 130, providing a positioning engine or other supporting services.

It will be understood that the performance of the system may be improved by making additional measurements. For example, if more than two wireless signals are transmitted from the same location, it may be advantageous to estimate one or more characteristic differences between each pair of the signals. Using these pairwise characteristic differences, a combined time of arrival for all of the signals can be estimated. Preferably, the combined ToA for the group of signals is estimated by coherently combining the signals—for example, coherently combining their respective CIRs. Improved performance may also be achieved by making additional measurements of the wireless signals by multiple devices. Because the same characteristic differences should be observed irrespective of the location of the receiver, estimates of the characteristic differences made by different electronic communications devices can be combined. This can provide increased signal-to-noise ratio and thereby increased accuracy.

It may also be advantageous to use multiple instances of each signal. In particular, the first and second wireless signals may be reference or synchronisation signals, which are transmitted periodically. Such signals are commonly used for channel estimation in wireless networks. Provided the transmitter timing is relatively stable, different instances of these synchronisation or reference signals can be used in methods according to embodiments. The different instances may be received by the same electronic communications device at different times, or they may be received by different electronic communications devices. Again, such additional measurements can help to improve signal-to-noise ratio and thereby accuracy. They can also be used to estimate the rate of change of the characteristic differences and derive or improve predictive models.

Figure 15:
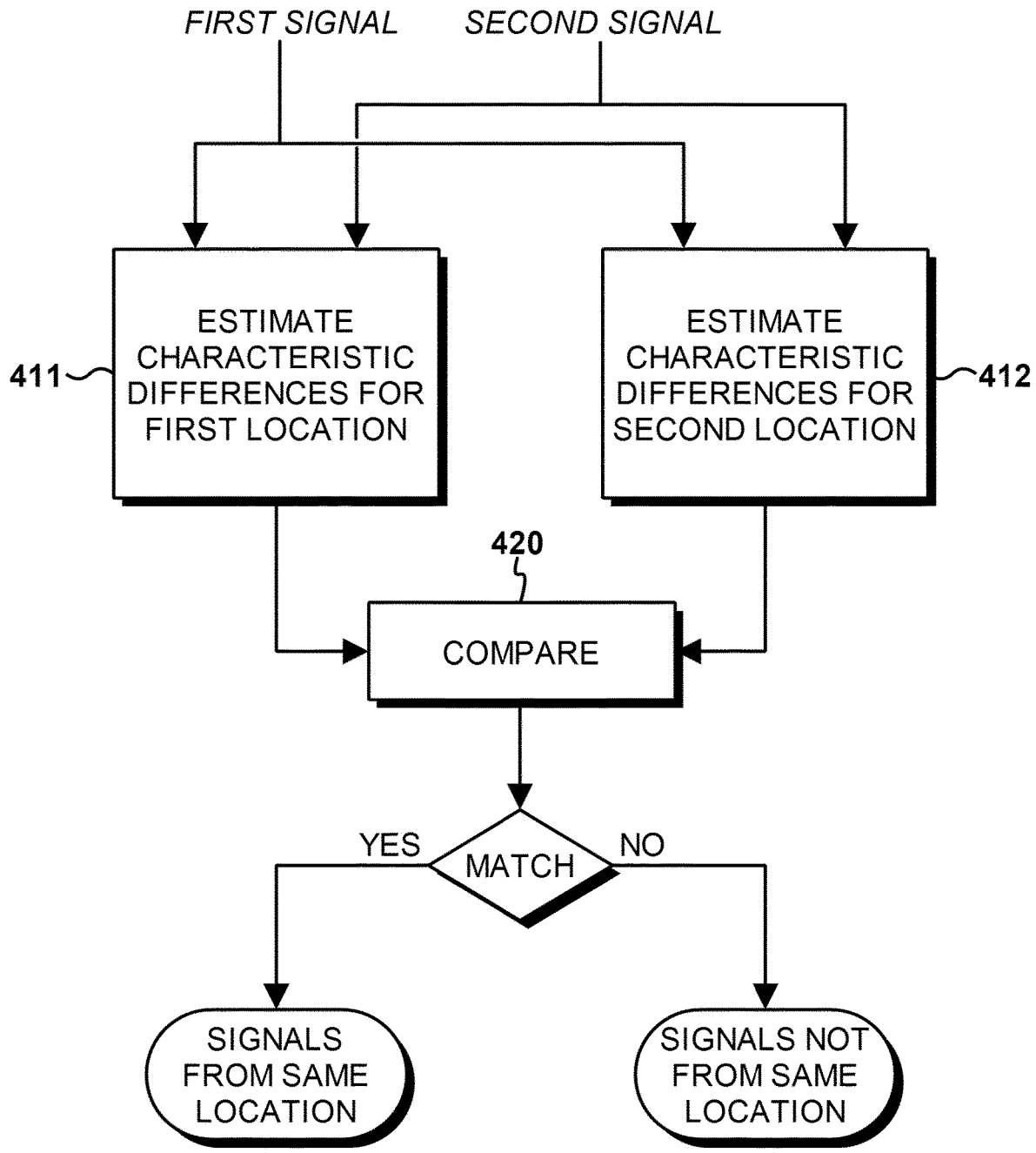
FIG. 15 is a flowchart illustrating a method of identifying that two wireless signals have been transmitted from the same location, according to an embodiment.

FIG. 15 is a flowchart illustrating a method of identifying that a first wireless signal and a second wireless signal were transmitted from the same location, according to an embodiment. This method assumes that measurements can be made of first and second wireless signals at different locations. Measurements may be made by the first and second electronic communications devices, such as UE1 and UE2 in FIG. 8.

As shown in FIG. 15, the method comprises, in step 411, estimating the one or more characteristic differences between the first and second wireless signals for a first location. This could be done, for example, by UE1 performing one of the methods of FIGS. 10-13. This would include UE1 receiving the first wireless signal and the second wireless signal at the first location, to produce first received signals. UE1 would then process the first received signals to estimate one or more first characteristic differences.

The method also comprises, in step 412, estimating the one or more characteristic differences for a second location. This could be done, for example by UE2 performing one of the methods of FIGS. 10-13. This would include UE2 receiving the first wireless signal and the second wireless signal at the second location, to produce second received signals. UE2 would then process the second received signals to estimate one or more second characteristic differences.

The method proceeds, in step 420, by comparing the characteristic differences estimated for the two locations. This can be done by UE1 sending the first characteristic differences to UE2, or UE2 sending the second characteristic differences to UE1, or by both UE1 and UE2 sending their respective estimated characteristic differences to some other device, such as server 130. The comparison of step 420 indicates whether the first and second characteristic differences match one another. They may be determined to match if an absolute difference between them is less than a predetermined threshold, for example. If the characteristic differences calculated for the two different locations match with one another, then the system determines that the signals were transmitted from the same location.

Figure 16:
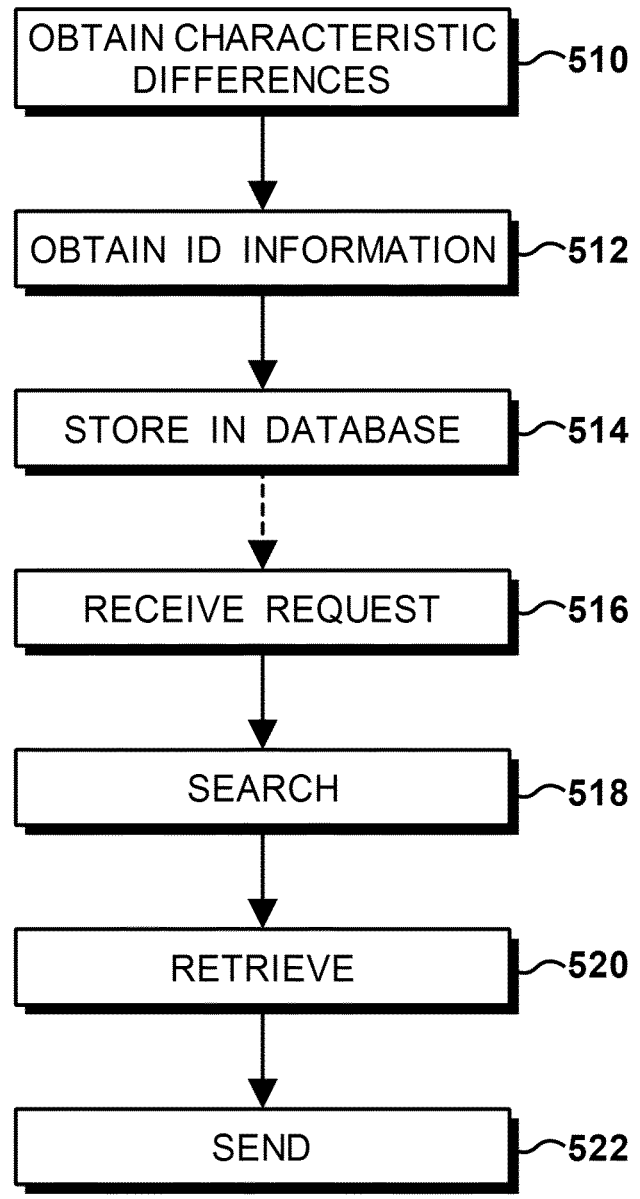
FIG. 16 is a flowchart illustrating a method of maintaining a database of characteristic difference information, according to an embodiment.

FIG. 16 shows a method of maintaining a database 132 of characteristic difference information. According to one embodiment, this method is performed by a processor of the server 130. In step 510, the processor obtains one or more characteristic differences between signals in several groups of signals. All of the signals in a given group are transmitted from the same location. The characteristic differences may be obtained through measurements made by electronic communications devices such as UE1 and UE2 in FIG. 8, which execute methods like those disclosed in FIGS. 10-13. In step 512, the processor obtains identity information identifying each group of signals. Preferably, the identity information for each group identifies the individual signals within that group. In this way, the group identity information identifies the individual signals as having been transmitted from the same location.

In step 514, the processor of the server 130 stores the characteristic differences in the database 132, such that they are associated with the respective identity information. For example, for each group of signals, the processor may store in the database one or more pairwise characteristic differences between each pair of signals in the group, associated with identity information identifying the two signals making up that pair. Thus, for a group of three signals A, B, and C, transmitted from the same location, the database may store characteristic differences associated with the three possible signal-pairings—A-B, B-C, and A-C. Alternatively, it may be sufficient to store a smaller set of information. For example, for the same group of three signals may be possible to store just the characteristic differences associated with any two pairings—such as A-B, and A-C. The characteristic differences between signals B and C can be inferred from this smaller set of information.

This stored information about the characteristic differences between pairs of signals can be used to assist another electronic communications device to calculate a combined ToA from other instances of the pairs of signals. To support this, the server 130 provides a service by which it retrieves the required information from the database 132 upon request.

In step 516, the processor receives a request for characteristic difference information that is associated with a specified target group of signals. This request may be received from another electronic communications device—for example UE3—which wishes to calculate a combined ToA using this target group of signals. The request includes identity information identifying the target group of signals. In step 518, using the target identity information to index the database 132, the processor of the server 130 searches for the required characteristic difference information. It retrieves this information from the database in step 520 and sends it to the requesting device (UE3) in step 522.

In some embodiments, the database 132 includes information about the rate of change of the characteristic differences and/or a predictive model describing how the characteristic differences evolve over time. In such embodiments, the method performed by the processor of the server 130 includes obtaining the rate of change and/or predictive model information; storing it in the database 132; searching for and retrieving it, in response to a request; and sending it to a requesting device.

Figure 17:
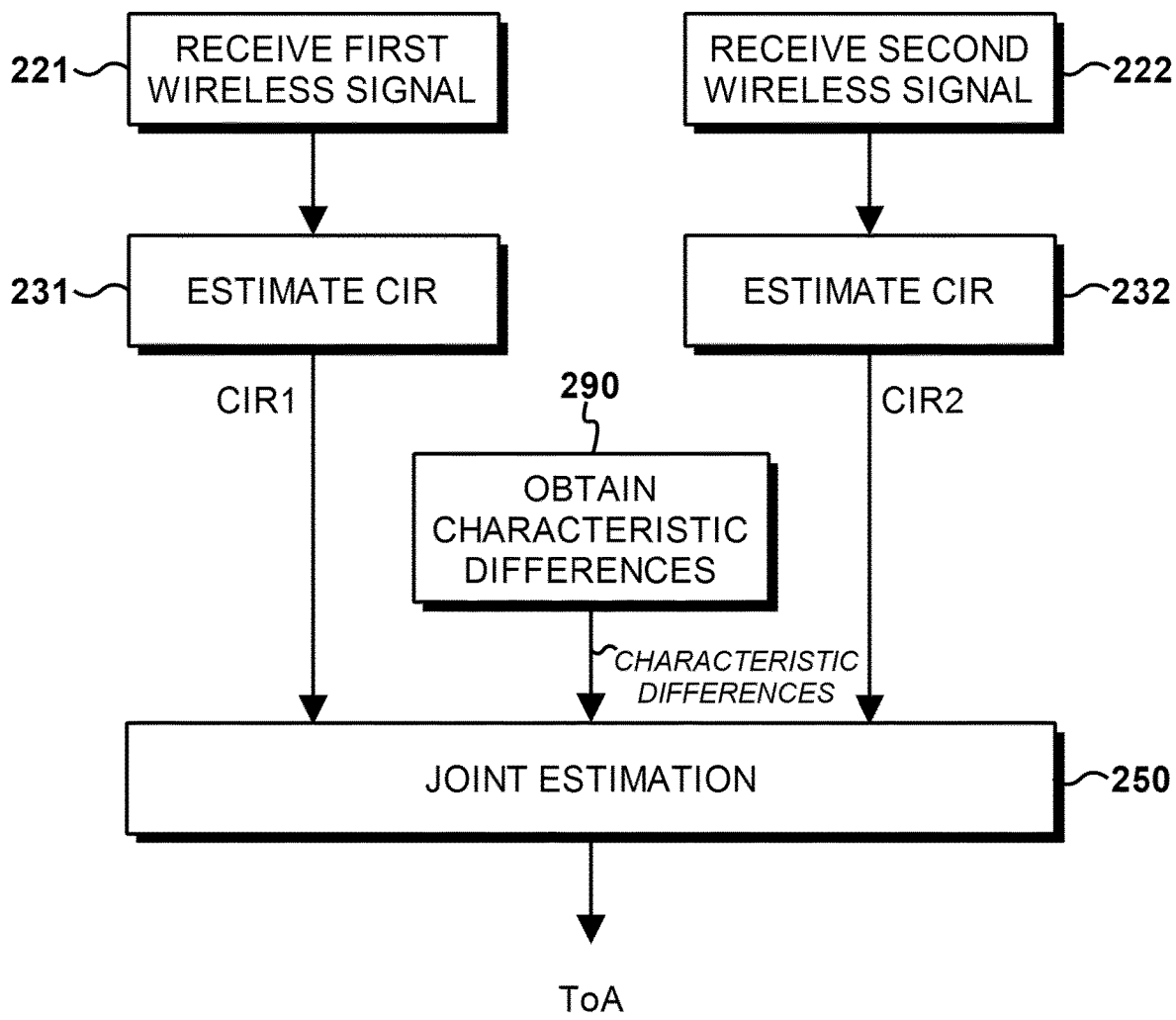
FIG. 17 is a flowchart illustrating a method of estimating a combined ToA according to another embodiment of the invention.

FIG. 17 illustrates a method performed by an electronic communications device such as UE3, according to an embodiment. This method may be performed in conjunction with the method of FIG. 16, performed by the processor of the server 130. The method of FIG. 17 is modelled on the method of FIG. 10 and is very similar to it. Steps 221, 222, 231, 232, and 250 are identical to the corresponding steps in the method of FIG. 10. The only difference is in the way that the characteristic differences are provided. In the method of FIG. 10, UE1 (or UE2) calculated the characteristic differences by comparing the CIRs of the received wireless signals. However, in the method of FIG. 17, the processor 124 of UE3 obtains the required characteristic differences from the server 130, in step 290. To do this, it sends a request to the server 130, wherein the request includes target identity information identifying the first and second wireless signals. The target identity information may comprise cell identity information, in the case of a cellular network. The server 130 searches the database 132; retrieves the corresponding characteristic differences; and sends them to UE3 (see FIG. 16). UE3 receives them and uses them, together with the CIRs, to calculate the combined ToA of the first and second wireless signals.

In each of the examples discussed above, it is assumed that the UEs (UE1, UE2, and UE3) send (and receive) data to (and from) the server 130, or send data between one another, via the network 100. In general, it is not necessary that the electronic communications devices (UE1, UE2, UE3) are part of the same wireless infrastructure network, or that any of them is in the same wireless infrastructure network as either of the base stations transmitting the first and second wireless signals. Indeed, methods according to the present invention may be most helpful when none of the devices is in the same wireless infrastructure network as any of the others, because in this scenario it may be particularly difficult (without the present invention) to make accurate estimates of the combined ToA of the signals.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of estimating one or more characteristic differences between two wireless signals, the method comprising:
   receiving a first wireless signal transmitted in a first frequency range;
   receiving a second wireless signal transmitted in a second frequency range, wherein the second frequency range is spaced from the first frequency range, and wherein the second wireless signal is transmitted from the same location as the first wireless signal;
   processing the first wireless signal and the second wireless signal to estimate the one or more characteristic differences between them, the one or more characteristic differences comprising at least one or any combination of two or more of:
   a relative offset in their time of transmission;
   a relative carrier phase relationship between them; and
   a relative amplitude relationship between them; and
   estimating a combined time of arrival for the first wireless signal and the second wireless signal, wherein estimating the combined time of arrival is based on the first wireless signal, the second wireless signal, and the one or more characteristic differences, and wherein estimating the combined time of arrival comprises:
      aligning a first channel impulse response and a second channel impulse response, based on the one or more characteristic differences, to generate aligned channel impulse responses;
      combining the aligned channel impulse responses to generate a combined channel impulse response; and
      estimating the combined time of arrival from the combined channel impulse response.

2. The method of claim 1, wherein processing the first wireless signal and the second wireless signal to estimate the one or more characteristic differences comprises:
   processing the first wireless signal to estimate the first channel impulse response;
   processing the second wireless signal to estimate the second channel impulse response; and
   comparing the first channel impulse response with the second channel impulse response to estimate the one or more characteristic differences.

3. The method of claim 2, wherein comparing the first channel impulse response with the second channel impulse response comprises calculating a cross-correlation function between the first channel impulse response and the second channel impulse response.

4. The method of claim 2, further comprising identifying one or more first multipath components in the first channel impulse response and identifying one or more second multipath components in the second channel impulse response, wherein the one or more characteristic differences are estimated based on the identified the one or more first multipath components and the one or more second multipath components, or the one or more characteristic differences are estimated jointly with the identifying of the one or more first multipath components and the one or more second multipath components.

5. The method of claim 1, wherein a transmitter of at least one of the first and second wireless signals has a plurality of different transmission modes, the method further comprising estimating the one or more characteristic differences between the first and second wireless signals for each respective transmission mode.

6. The method of claim 1,
   wherein estimating the combined time of arrival is done jointly with processing the first wireless signal and the second wireless signal to estimate the one or more characteristic differences.

7. The method of claim 4, further wherein estimating the combined time of arrival for the first wireless signal and the second wireless signal is based on:
   the one or more first multipath components; and
   the one or more second multipath components.

8. The method of claim 4,
wherein estimating the combined time of arrival is done jointly based on at least one of:
(i) processing the first wireless signal and the second wireless signal to estimate the one or more characteristic differences, or
(ii) identifying the one or more first multipath components and the one or more second multipath components.

9. The method of claim 7, further comprising:
identifying a first line-of-sight component from among the one or more first multipath components; and
identifying a second line-of-sight component from among the one or more second multipath components,
wherein the combined time of arrival is estimated based on the first and second line of sight components.

10. The method of claim 7, wherein estimating the combined time of arrival further comprises:
aligning the one or more first multipath components and the one or more second multipath components, based on the one or more characteristic differences, to generate an aligned set of multipath components; and
estimating the combined time of arrival from the aligned set of multipath components.

11. The method of claim 1, further comprising estimating a rate of change of at least one of the one or more characteristic differences.

12. The method of claim 11, further comprising generating a model for predicting a value of the at least one of the one or more characteristic differences at other times.

13. A method of identifying that a first wireless signal and a second wireless signal were transmitted from the same location, the method comprising:
receiving, at a first location, a first wireless signal and a second wireless signal, thereby producing first received signals;
receiving, at a second location, the first wireless signal and the second wireless signal, thereby producing second received signals;
processing the first received signals to estimate one or more first characteristic differences between them;
processing the second received signals to estimate one or more second characteristic differences between them;
comparing the one or more first characteristic differences with the one or more second characteristic differences to determine whether they match; and
in response to a determination that the one or more first characteristic differences match with the one or more second characteristic differences, determining that the first and second wireless signals were transmitted from the same location,
wherein the first wireless signal is transmitted in a first frequency range and the second wireless signal is transmitted in a second frequency range, spaced from the first frequency range, and
wherein at least one of the one or more first characteristic differences or the one or more second characteristic differences comprise at least one or any combination of two or more of:
a time offset;
a carrier phase relationship; and
an amplitude relationship,
wherein at least one of processing the first received signals or processing the second received signals further comprises:
estimating a combined time of arrival for the first wireless signal and the second wireless signal, wherein estimating the combined time of arrival is based on the first wireless signal, the second wireless signal, the one or more first characteristic differences, or the one or more second characteristic differences, and wherein estimating the combined time of arrival comprises:
aligning a first channel impulse response and a second channel impulse response, based on the one or more first characteristic differences or the one or more second characteristic differences, to generate aligned channel impulse responses;
combining the aligned channel impulse responses to generate a combined channel impulse response; and
estimating the combined time of arrival from the combined channel impulse response.

14. A method of maintaining a database of characteristic difference information associated with groups of signals, each group of signals being transmitted from a respective location, at least one group of signals including a first wireless signal transmitted in a first frequency range and a second wireless signal transmitted in a second frequency range spaced from the first frequency range, the method comprising:
obtaining one or more characteristic differences between signals in each group, wherein the one or more characteristic differences comprise at least one or any combination of two or more of:
a time offset,
a carrier phase relationship, and
an amplitude relationship,
obtaining identity information identifying each group of signals; and
storing the one or more characteristic differences in the database, associated with the identity information,
the method further comprising:
receiving a request for characteristic difference information associated with a target group of signals, the request including target identity information identifying the target group of signals;
searching the database using the target identity information; and
retrieving from the database the one or more characteristic differences for the target group of signals,
wherein obtaining the one or more characteristic differences between the signals in each group comprises:
estimating a combined time of arrival for the signals, wherein estimating the combined time of arrival is based on the signals and the one or more characteristic differences, and wherein estimating the combined time of arrival comprises:
aligning each of channel impulse responses associated with the signals, based on the one or more characteristic differences, to generate aligned channel impulse responses;
combining the aligned channel impulse responses to generate a combined channel impulse response; and
estimating the combined time of arrival from the combined channel impulse response.

15. The method of claim 14, wherein the database further stores, for each group of signals, one or both of:
a rate of change of at least one of the one or more characteristic differences associated with the group; and
a model for predicting a value of at least one of the one or more characteristic difference at different times.

16. A non-transitory computer-readable medium having stored therein instructions that, when executed by at least one physical computing device, perform a method for estimating one or more characteristic differences between two wireless signals, the method comprising:
- receiving a first wireless signal transmitted in a first frequency range;
- receiving a second wireless signal transmitted in a second frequency range, wherein the second frequency range is spaced from the first frequency range, and wherein the second wireless signal is transmitted from the same location as the first wireless signal;
- processing the first wireless signal and the second wireless signal to estimate the one or more characteristic differences between them, the one or more characteristic differences comprising at least one or any combination of two or more of:
- a relative offset in their time of transmission,
- a relative carrier phase relationship between them, and
- a relative amplitude relationship between them, and
- estimating a combined time of arrival for the first wireless signal and the second wireless signal, wherein estimating the combined time of arrival is based on the first wireless signal, the second wireless signal, and the one or more characteristic differences, and wherein estimating the combined time of arrival comprises:
  - aligning a first channel impulse response and a second channel impulse response, based on the one or more characteristic differences, to generate aligned channel impulse responses;
  - combining the aligned channel impulse responses to generate a combined channel impulse response; and
  - estimating the combined time of arrival from the combined channel impulse response.

17. An electronic communications device for estimating one or more characteristic differences between two wireless signals, comprising:
- a first receiver, configured to receive a first wireless signal transmitted in a first frequency range;
- a second receiver, configured to receive a second wireless signal transmitted in a second frequency range, wherein the second frequency range is spaced from the first frequency range, and wherein the second wireless signal is transmitted from the same location as the first wireless signal; and
- a processor, configured to process the first wireless signal and the second wireless signal to estimate the one or more characteristic differences between them, the one or more characteristic differences comprising at least one or any combination of two or more of:
- a relative offset in their time of transmission;
- a relative carrier phase relationship between them; and
- a relative amplitude relationship between them,
- wherein estimating the one or more characteristic differences comprises:
- estimating a combined time of arrival for the first wireless signal and the second wireless signal, wherein estimating the combined time of arrival is based on the first wireless signal, the second wireless signal, and the one or more characteristic differences, and wherein estimating the combined time of arrival comprises:
  - aligning a first channel impulse response and a second channel impulse response, based on the one or more characteristic differences, to generate aligned channel impulse responses;
  - combining the aligned channel impulse responses to generate a combined channel impulse response; and
  - estimating the combined time of arrival from the combined channel impulse response.

18. An electronic communications device comprising:
- a first receiver, configured to receive a first wireless signal transmitted in a first frequency range;
- a second receiver, configured to receive a second wireless signal transmitted in a second frequency range, wherein the second frequency range is spaced from the first frequency range, and wherein the second wireless signal is transmitted from the same location as the first wireless signal; and
- a processor, configured to:
  - obtain one or more characteristic differences between the first wireless signal and the second wireless signal, and
  - estimate a combined time of arrival for the first wireless signal and the second wireless signal, based on: the first wireless signal, the second wireless signal, and the one or more characteristic differences,
- wherein estimating the combined time of arrival further comprises:
  - aligning a first channel impulse response and a second channel impulse response, based on the one or more characteristic differences, to generate aligned channel impulse responses;
  - combining the aligned channel impulse responses, to generate a combined channel impulse response; and
  - estimating the combined time of arrival from the combined channel impulse response.

* * * * *